US012214596B2

(12) United States Patent
Osakabe et al.

(10) Patent No.: US 12,214,596 B2
(45) Date of Patent: Feb. 4, 2025

(54) LIQUID DISCHARGING APPARATUS

(71) Applicant: BROTHER KOGYO KABUSHIKI KAISHA, Nagoya (JP)

(72) Inventors: Yoshinori Osakabe, Seto (JP); Fumio Nakazawa, Okazaki (JP); Taichi Shirono, Nagoya (JP); Sosuke Kuroyanagi, Nishio (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/690,557

(22) Filed: Mar. 9, 2022

(65) Prior Publication Data

US 2022/0305800 A1 Sep. 29, 2022

(30) Foreign Application Priority Data

Mar. 26, 2021 (JP) ................................ 2021-053748

(51) Int. Cl.
*B41J 2/175* (2006.01)

(52) U.S. Cl.
CPC ....... *B41J 2/17556* (2013.01); *B41J 2/17596* (2013.01)

(58) Field of Classification Search
CPC ................ B41J 2/17556; B41J 2/17596; B41J 2/16508; B41J 2/1714; B41J 2/17553; B41J 29/38; B41J 2/17513; B41J 2/175; B41J 2/07; B41J 2/17503
USPC ................................................ 347/1, 85, 86
See application file for complete search history.

(56) References Cited

U.S. PATENT DOCUMENTS

2004/0252156 A1* 12/2004 Seshimo .............. B41J 2/16532 347/30
2005/0275682 A1 12/2005 Seshimo et al.
2008/0012893 A1 1/2008 Sakakitani
(Continued)

FOREIGN PATENT DOCUMENTS

CN 201970579 U 9/2011
DE 19803830 A1 1/2000
(Continued)

OTHER PUBLICATIONS

Notice of Reasons for Refusal issued in the corresponding Japanese Patent Application No. 2021-053748, Dec. 3, 2024.

*Primary Examiner* — Jason S Uhlenhake
*Assistant Examiner* — Alexander D Shenderov
(74) *Attorney, Agent, or Firm* — Merchant & Gould P.C.

(57) ABSTRACT

A liquid discharging apparatus includes: a head having a nozzle which discharges liquid therefrom; a storing part, at least a part of the storing part being positioned above an opening of the nozzle, the liquid being stored in the storing part while forming a liquid surface; and an atmosphere communicating channel which communicates a gas layer of the storing part with outside of the storing part; and a valve unit which is switched between a communication state in which the valve unit communicates the gas layer of the storing part with the outside and a non-communication state in which the valve unit does not communicate the gas layer of the storing part with the outside. The valve unit is switched from the non-communication state to the communication state in a case that a power source is changed from a turned-on state to a turned-off state.

15 Claims, 17 Drawing Sheets

(56) References Cited

U.S. PATENT DOCUMENTS

| | | | | |
|---|---|---|---|---|
| 2008/0165229 | A1* | 7/2008 | Umeda | B41J 2/17509 347/85 |
| 2009/0214228 | A1 | 8/2009 | Ito | |
| 2011/0181638 | A1* | 7/2011 | Kim | B41J 2/17513 347/7 |
| 2011/0267406 | A1 | 11/2011 | Hanson | |
| 2015/0375518 | A1* | 12/2015 | Sugitani | B41J 2/175 347/6 |
| 2016/0121615 | A1* | 5/2016 | Igarashi | B41J 2/17553 347/85 |
| 2021/0300020 | A1 | 9/2021 | Osakabe et al. | |

FOREIGN PATENT DOCUMENTS

| | | | |
|---|---|---|---|
| JP | 2002-321386 | | 11/2002 |
| JP | 2003-165233 | A | 6/2003 |
| JP | 2003-226022 | A | 8/2003 |
| JP | 2004-314604 | A | 11/2004 |
| JP | 2007-98731 | | 4/2007 |
| JP | 2007-112002 | A | 5/2007 |
| JP | 2008-18599 | A | 1/2008 |
| JP | 2008-149645 | A | 7/2008 |
| JP | 2009-196232 | A | 9/2009 |
| JP | 2010-12637 | | 1/2010 |
| JP | 2021-160123 | | 10/2021 |

* cited by examiner

LIQUID DISCHARGING APPARATUS

CROSS REFERENCE TO RELATED APPLICATIONS

The present application claims priority from Japanese Patent Application No. 2021-053748, filed on Mar. 26, 2021, the disclosure of which is incorporated herein by reference in its entirety.

BACKGROUND

The present disclosure relates to a liquid discharging apparatus having a head which discharges liquid supplied from a storing part.

As a liquid discharging apparatus, an ink-jet recording apparatus is publicly known. In the ink-jet recording apparatus, a meniscus having a concaved shape, as seen from the outside of a head, is formed in a nozzle of the head in order to secure the discharge stability of ink.

For example, in a certain ink-jet recording apparatus, in a state that the head discharges the ink, a valve body releases an air inflow adjusting part. With this, the air flows into an ink tank via the air inflow adjusting part. In a case that the ink tank moves to below an operating part, the valve body is brought into contact with the operating part to thereby change the posture of the valve body, and to close the air inflow adjusting part.

SUMMARY

In the above-described ink-jet recording apparatus, there is such a case that the power source of the apparatus is turned off in a state that the valve body closes the air inflow adjusting part, in some cases. In a case, for example, that the temperature rises and an air layer of the ink tank is swelled during a period of time in which the power source is turned off, the meniscus is destroyed in the nozzle of the head, in some cases. As a result, there is such a fear that the ink might leak out from the nozzle of the head.

The present disclosure has been made in view of the above-described situation, and an object of the present disclosure is to provide a liquid discharging apparatus capable of lowering the occurrence of such a situation that the liquid leaks out from the nozzle of the head.

According to a first aspect of the present disclosure, there is provided a liquid discharging apparatus including:

a head having a nozzle configured to discharge liquid therefrom;

a storing part, at least a part of the storing part being positioned above an opening of the nozzle, the liquid being stored in the storing part while forming a liquid surface;

an atmosphere communicating channel configured to communicate a gas layer of the storing part with outside of the storing part, via an atmosphere opening port; and a valve unit configured to be switched between a communication state in which the valve unit communicates the gas layer of the storing part with the outside of the storing part and a non-communication state in which the valve unit does not communicate the gas layer of the storing part with the outside of the storing part, wherein the valve unit is configured to be switched from the non-communication state to the communication state in a case that a power source is changed from a turned-on state to a turned-off state.

Even in a case that the external environment is changed due to, for example, any increase in the temperature during a period of time in which the power source of the apparatus is turned off, the valve unit is switched from the non-communication state to the communication state to thereby making it possible to lower the occurrence of such a situation that the liquid leaks from the nozzle of the head.

According to a second aspect of the present disclosure, there is provided a liquid discharging apparatus including:

a head having a nozzle configured to discharge liquid therefrom;

a storing part, at least a part of the storing part being positioned above an opening of the nozzle, the liquid being stored in the storing part while forming a liquid surface;

an atmosphere communicating channel configured to communicate a gas layer of the storing part with outside of the storing part via an atmosphere opening port; and a valve unit configured to be switched between a communication state in which the valve unit communicates the gas layer of the storing part with the outside of the storing part and a non-communication state in which the valve unit does not communicate the gas layer of the storing part with the outside of the storing part, wherein the valve unit is configured to be switched from the non-communication state to the communication state after a power source has been changed from a turned-on state to a turned-off state.

BRIEF DESCRIPTION OF THE DRAWINGS

FIGS. 6A and 6B are each a cross-sectional view of an atmosphere communicating device according to the first embodiment, wherein FIG. 6A is a view regarding a situation that a valve unit is in a communication state, and FIG. 6B is a view regarding a situation that the valve unit is in a non-communication state.

DETAILED DESCRIPTION

Figure 1:
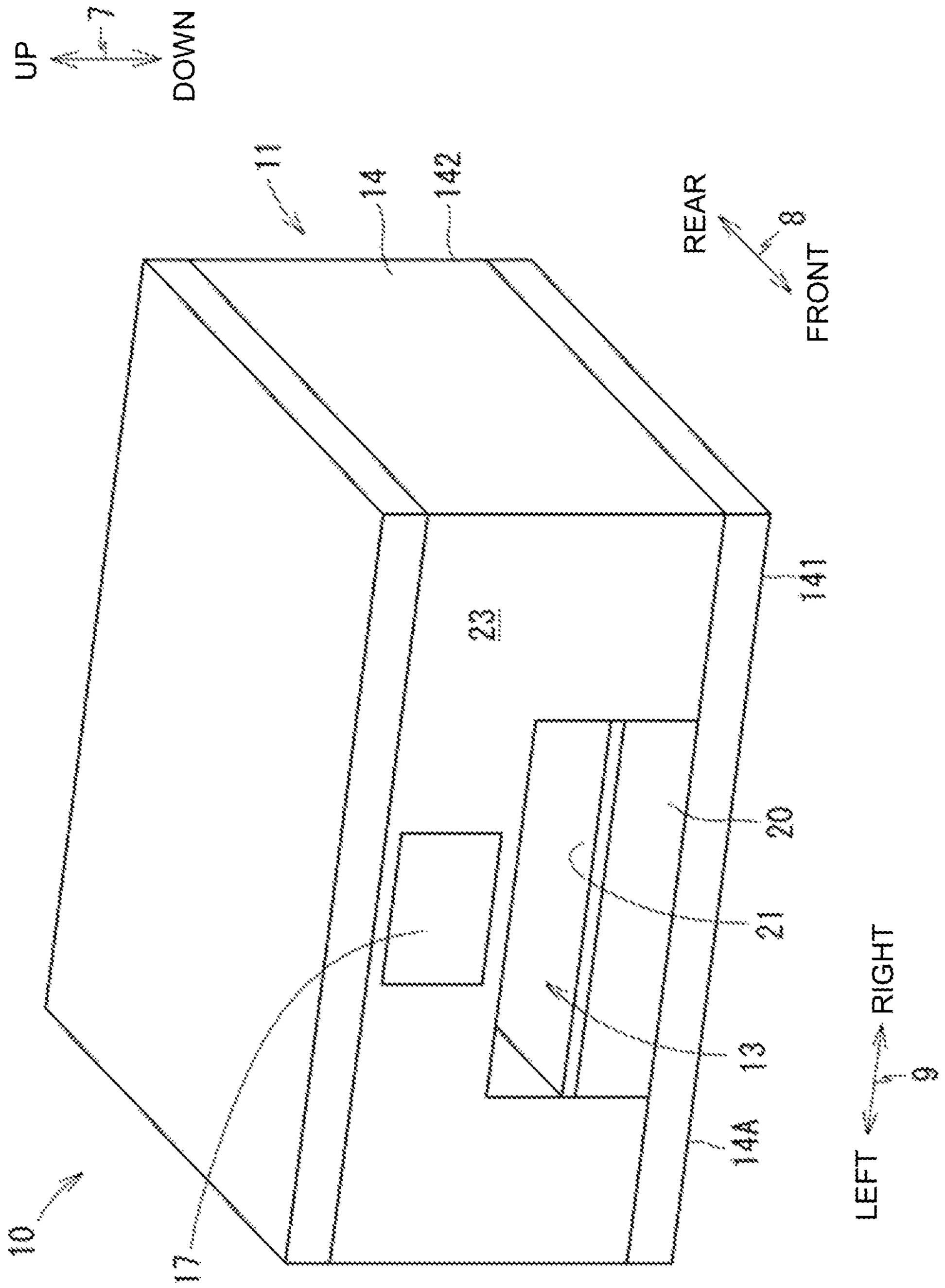
FIG. 1 is a perspective view of a multifunction peripheral according to a first embodiment of the present disclosure.

Embodiments to be explained below are each a mere example of the present disclosure; it is needless to say that each of the embodiments can be appropriately changed without changing the gist of the present disclosure. Further, in the following explanation, advancement or movement (progress) directed from a starting point to an end point of an arrow is expressed as an "orientation", and going forth and back on a line connecting the starting point and the end point of the arrow is expressed as a "direction". Furthermore, in the following description, an up-down direction 7 is defined, with a state in which a multifunction peripheral 10 is usably installed (the state of FIG. 1) as the reference; a front-rear direction 8 is defined, with a side on which an opening 13 is provided is defined as a front surface 23; and a left-right direction 9 is defined, with the multifunction peripheral 10 as seen from the front side. The up-down direction 7, the front-rear direction 8, and the left-right direction 9 are orthogonal to one another.

First Embodiment

In the following, a first embodiment will be explained.

<Overall Configuration of Multifunction Peripheral 10>

As depicted in FIG. 1, the multifunction peripheral 10 (an example of a "liquid discharging apparatus") has a casing 14 which has a substantially rectangular parallelepiped shape. A printer part 11 is provided at a lower part of the casing 14. The multifunction peripheral 10 has various kinds of functions such as a facsimile function, a print function, etc. The multifunction peripheral 10 has a function, as the print function, of recording an image on one surface of a sheet 12 (paper sheet 12; see FIG. 2) in an ink-jet system. Note that the multifunction peripheral 10 may also be configured to record an image on both surfaces of the sheet 12. An operating part 17 is provided on an upper part of the casing 14. The operating part 17 is constructed of a button configured to be operated for instructing the image recording, for performing a various kinds of settings, etc., a power switch button, a liquid crystal display configured to display a various kinds of information thereon, and the like. The operating part 17 is constructed of a touch panel having both of the function of the button and the function of the liquid crystal display.

Figure 2:
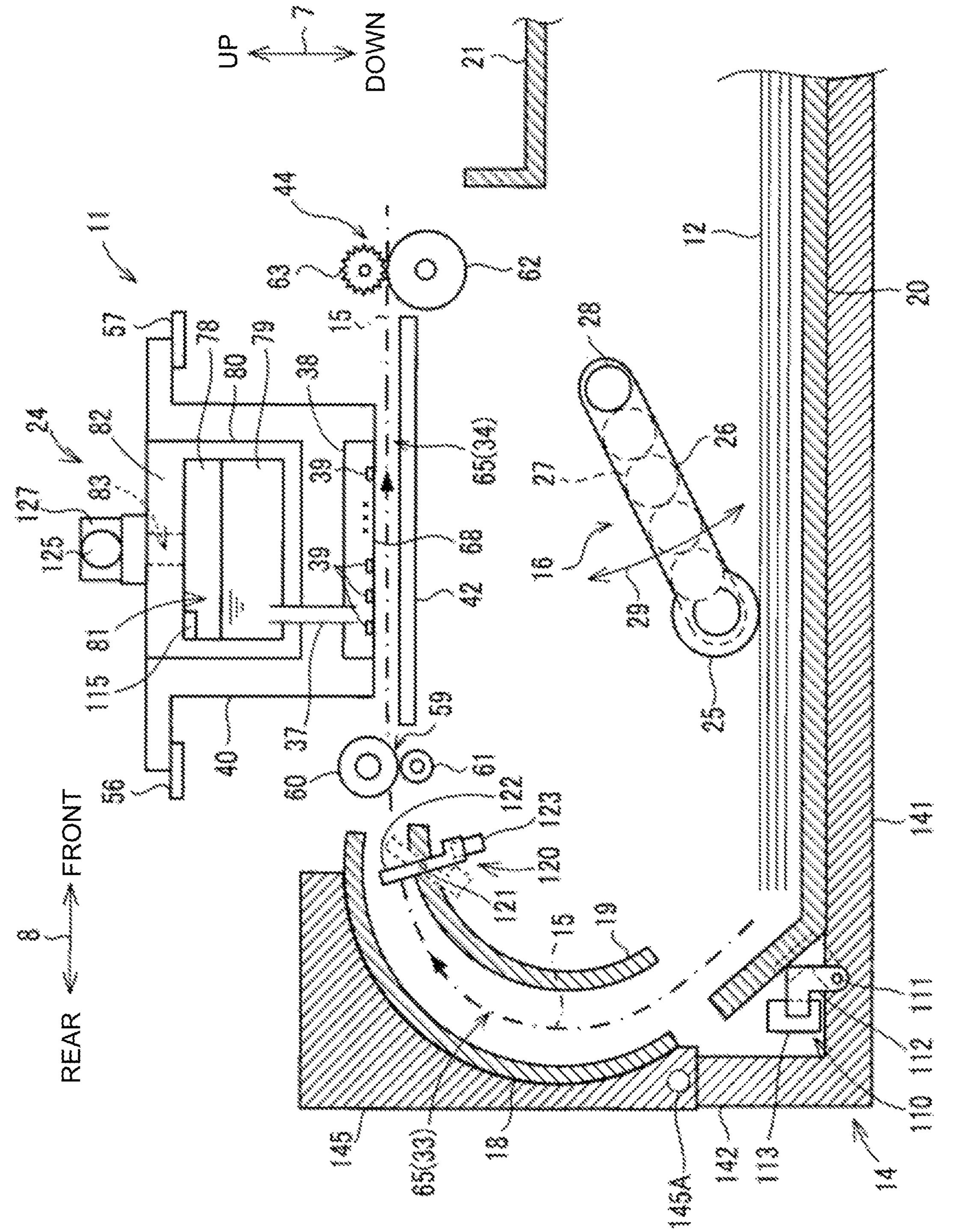
FIG. 2 is a vertical cross-sectional view schematically depicting the internal structure of a printer part.

As depicted in FIG. 2, the printer part 11 has a feed tray 20, a feeding part 16, an outer guide member 18, an inner guide member 19, a conveying roller pair 59, a discharging roller pair 44, a platen 42, a recording part 24, a cap 70 (see FIG. 3), an atmosphere communicating device 48 (see FIG. 3), a temperature sensor 115, a sheet sensor 120, a rotary encoder 75 (see FIG. 7), a controller 130 (see FIG. 7) and a memory 140 (see FIG. 7) which are arranged inside the casing 14.

<Feed Tray 20>

As depicted in FIG. 1, an opening 13 is formed in the front surface 23 of the printer part 11. The feed tray 20 is insertable and removable with respect to the casing 14 via the opening 13, by moving in the front-rear direction 8.

As depicted in FIG. 2, in a case that the feed tray 20 is at a feeding position, the sheet 12 supported by the feed tray 20 is allowed to be fed to a conveying route 65.

<Feeding Part 16>

As depicted in FIG. 2, the feeding part 16 is arranged at a location below the recording part 24 and above the feed tray 20. The feeding part 16 is provided with a feeding roller 25, a feeding arm 26, a driving transmitting mechanism 27 and a shaft 28, and is capable of feeding the sheet 12 to the conveying route 65.

<Conveying Route 65>

As depicted in FIG. 2, the conveying route 65 is extended from a rear end part of the feed tray 20. The conveying route 65 is provided with a curved part 33 and a straight part 34. The curved part 33 extends toward the upper side while making a U-turn from the rear side to the front side. The straight part 34 extends substantially along the front-rear direction 8.

The curved part 33 is formed by the outer guide member 18 and the inner guide member 19 which face or are opposite to each other, with a predetermined spacing distance therebetween. At a position wherein the recording part 24 is arranged, the straight part 34 is formed by the recording part 24 and the platen 42 which face each other with a predetermined spacing distance therebetween.

The sheet 12 supported by the feed tray 20 is conveyed in the curved part 33 by the feeding roller 25, and reaches the conveying roller pair 59. The sheet 12 pinched or held by the conveying roller pair 59 is conveyed frontward in the straight part 34 toward the recording part 24. The recording part 24 records an image on the sheet 12 which has reached a location immediately below the recording part 24. The sheet 12 having the image recorded thereon is conveyed frontward in the straight part 34, and is discharged (exhausted) to the discharge tray 21. As described above, the sheet 12 is conveyed along a conveying orientation 15 which is indicated by an arrow of an alternate long and short dash line in FIG. 2.

<Conveying Roller Pair 59 and Discharge Roller Pair 44>

As depicted in FIG. 2, the conveying roller pair 59 is arranged in the straight part 34. The discharge roller pair 44 is arranged, in the straight part 34, on the downstream side in the conveying orientation 15 with respect to the conveying roller pair 59.

The conveying roller pair 59 is provided with a conveying roller 60 and a pinch roller 61 which is arranged at a location below the conveying roller 60 so as to face the conveying roller 60. The pinch roller 61 is pressed against the conveying roller 60 by an elastic member (not depicted in the drawings) such as a coil spring, etc. The conveying roller pair 59 is capable of pinching or holding the sheet 12 therebetween.

The discharging roller pair 44 is provided with a discharging roller 62 and a spur roller 63 which is arranged at a location above the discharging roller 62 so as to face the discharging roller 62. The spur roller 63 is pressed toward the discharging roller 62 by an elastic member (not depicted in the drawings) such as a coil spring, etc. The discharging roller pair 44 is capable of pinching or holding the sheet 12 therebetween.

Figure 7:
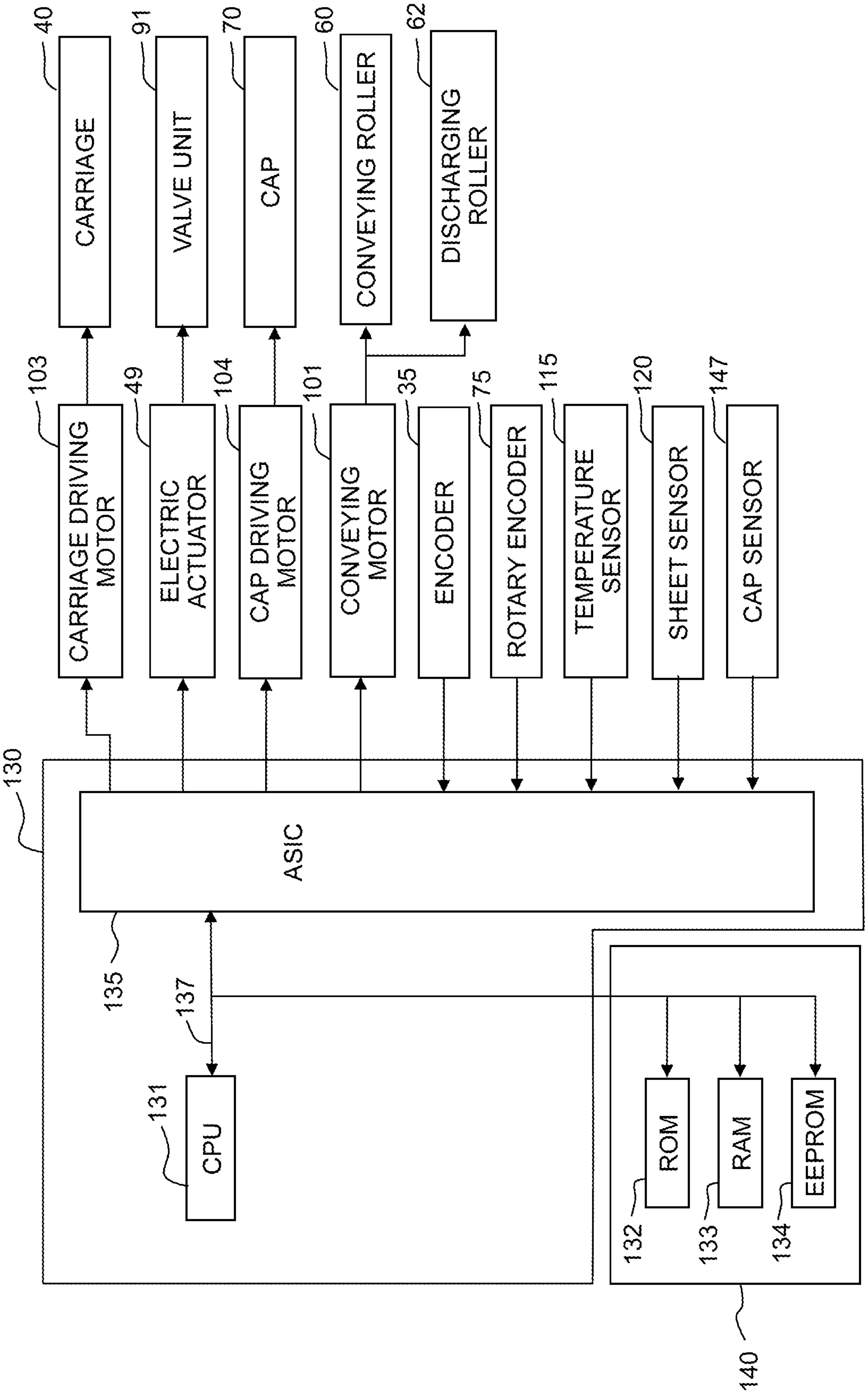
FIG. 7 is a functional block diagram of the multifunction peripheral.

The conveying roller 60 and the discharging roller 62 rotate in a case that a driving force is applied to the conveying roller 60 and the discharging roller 62 from the conveying motor 101 (see FIG. 7). In a case that the conveying roller 60 rotates in a state that the sheet 12 is pinched by the conveying roller pair 59, the sheet 12 is conveyed in the conveying orientation 15 by the conveying roller pair 59, and is conveyed onto the platen 42. In a case that the discharging roller 62 rotates in a state that the sheet 12 is pinched by the discharging roller pair 44, the sheet 12 is conveyed in the conveying orientation 15 by the discharging roller pair 44, and is discharged onto the discharge tray 21.

<Platen 42>

As depicted in FIG. 2, the platen 42 is arranged in the straight part 34 of the conveying route 65. The platen 42 faces the recording part 24 in the up-down direction 7. The platen 42 supports the sheet 12 which is conveyed in the conveying route 65 from therebelow.

Figure 3:
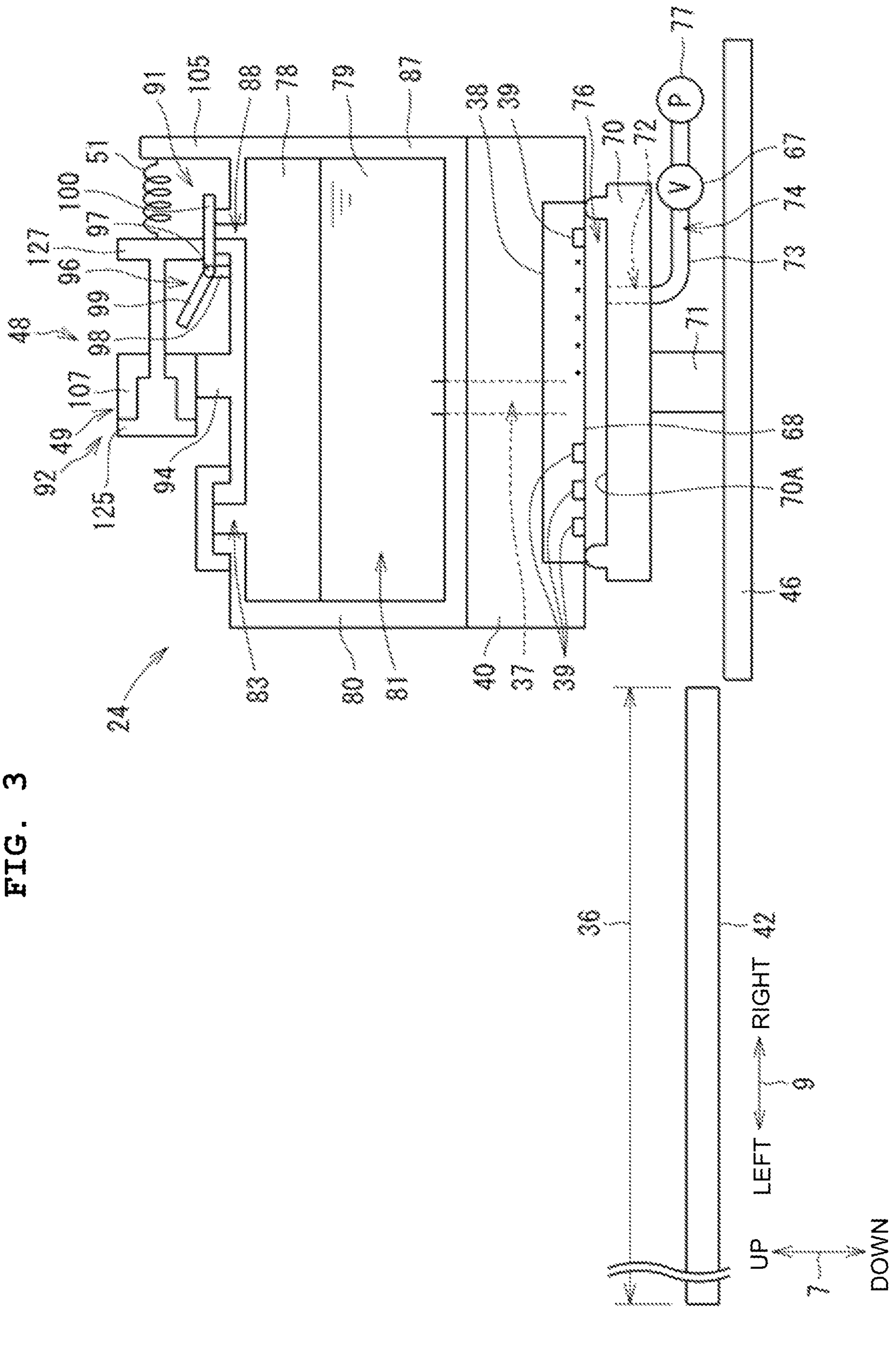
FIG. 3 is a vertical cross-sectional view depicting cross sections of a platen and a recording part as being cut by a plane orthogonal to a front-rear direction, indicating a state that a carriage is positioned at a maintenance position and that a cap is positioned at a covering position.
Figure 4:
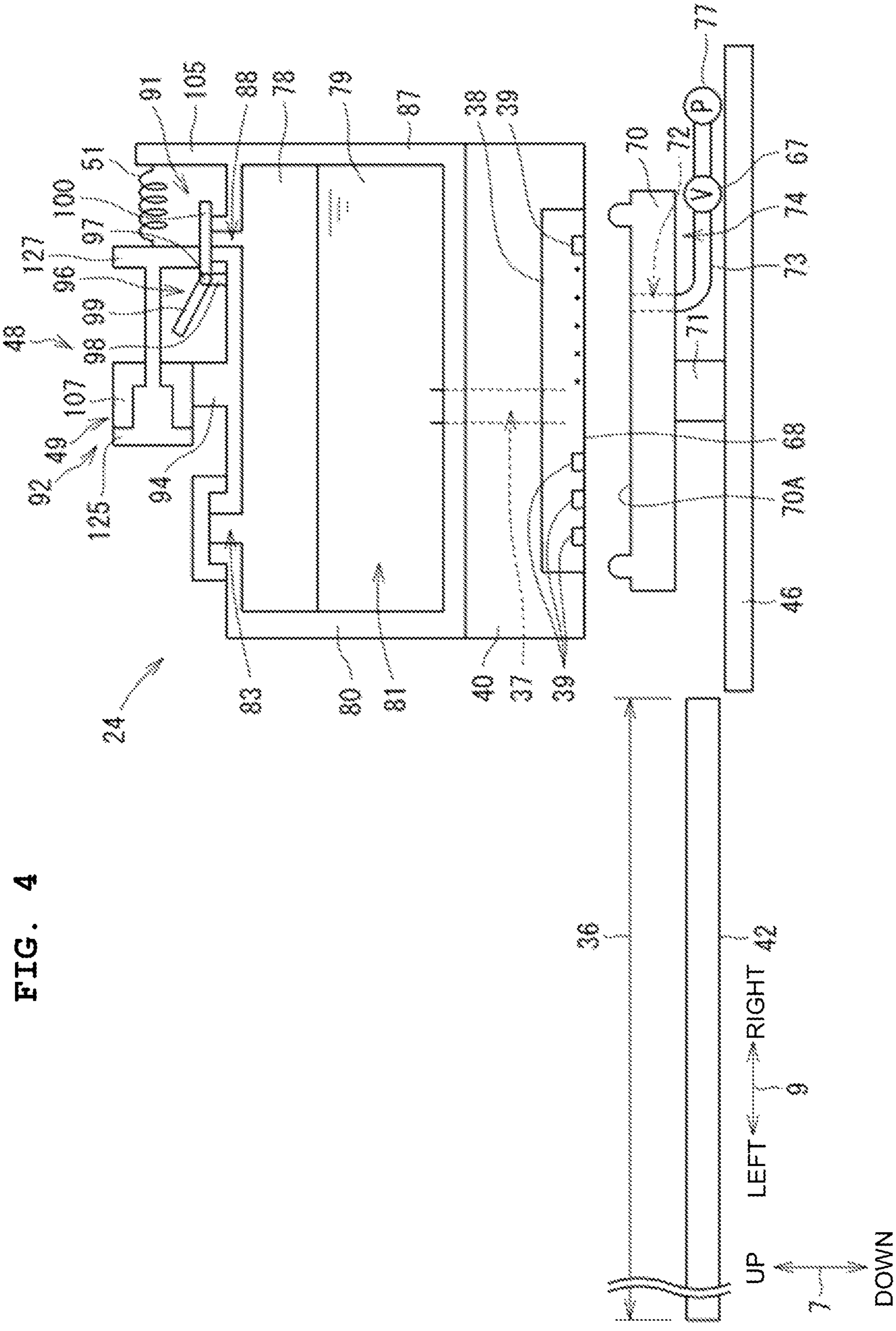
FIG. 4 is a vertical cross-sectional view depicting the cross sections of the platen and the recording part as being cut by the plane orthogonal to the front-rear direction, indicating a state that the carriage is positioned at the maintenance position and that the cap is positioned at a separate position.
Figure 5:
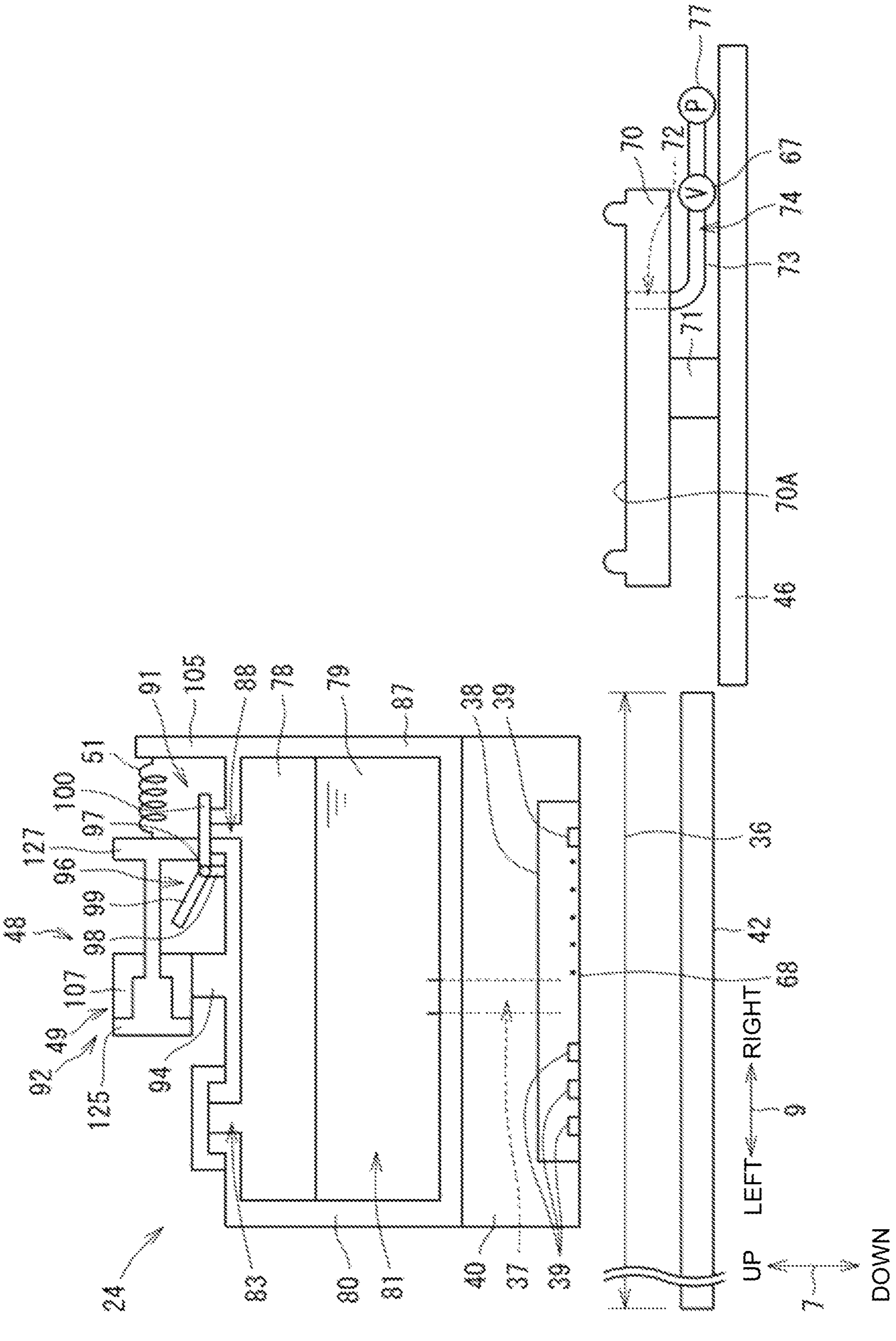
FIG. 5 is a vertical cross-sectional view depicting the cross sections of the platen and the recording part as being cut by the plane orthogonal to the front-rear direction, indicating a state that the carriage is positioned above a medium passing area and that the cap is positioned at the separate position.

The sheet 12 which is conveyed in the conveying route 65 passes a medium passing area 36 between a right end and a left end of the platen 42 in the left-right direction 9 (see FIGS. 3 to 5).

<Recording Part 24>

As depicted in FIG. 2, the recording part 24 is arranged at a location above the platen 42 so as to face the platen 42. The recording part 24 is provided with a carriage 40, a head 38 and a tank 80.

The carriage 40 is supported to be movable in the left-right direction 9 (an example of a "scanning direction") which is orthogonal to the conveying orientation 15, by two guide rails 56 and 57 which are arranged in the front-rear direction 8 with a spacing distance therebetween. The carriage 40 is configured to move while having the head 38 mounted thereon. The tank 80 is mounted on the carriage 40 in a state that at least part of the carriage 80 is positioned above the head 38. The carriage 40 is movable, in the left-right direction 9, from the right side with respect to the medium passing area 36 to the left side with respect to the medium passing area 36. Note that the moving direction of the carriage 40 is not limited to the left-right direction 9, and the moving direction may be a direction crossing the conveying orientation 15.

The guide rails 56 and 57 are supported by a pair of side frames (not depicted in the drawings) which are arranged, in the left-right direction 9, at the outside of the straight part 34 of the conveying route 65. The carriage 40 is moved in a case that a driving force is applied to the carriage 40 from a carriage driving motor 103 (see FIG. 7), as depicted in FIG. 7.

An encoder 35 (see FIG. 7) is arranged in the guide rail 56 or the guide rail 57. The encoder 35 is provided with an encoder strip extending in the left-right direction 9, and an optical sensor which is provided, on the carriage 40, at a location facing the encoder strip. The optical sensor detects a light transmitting part and a light shielding part of the encoder strip, thereby detecting a pulse signal. The pulse signal is a signal in accordance with the position in the left-right direction 9 of the carriage 40. The pulse signal is outputted to the controller 130 (see FIG. 7).

The head 38 is supported by the carriage 40. A lower surface 68 of the head 38 is exposed downward, and faces the platen 42. The head 38 is configured to discharge or eject an ink in a case that the carriage 40 is moving in the left-right direction 9. The head 38 is provided with a plurality of nozzles 39, an ink channel 37 and a piezoelectric element (not depicted in the drawings).

The plurality of nozzles 39 are opened in the lower surface 68 of the head 38, and discharge an ink (an example of "liquid"). The ink channel 37 connects or links the tank 80 and the plurality of nozzles 39. The piezoelectric element deforms a part of the ink channel 37 to thereby cause a droplet of an ink (ink droplet) to be discharged or ejected downward from each of the plurality of nozzle 39.

The tank 80 (an example of a "storing part") is mounted on the carriage 40. The tank 80 has an ink chamber 81. An ink is stored in the ink chamber 81 while forming a liquid surface. The ink chamber 81 is partitioned into a gas layer 78 and an ink layer 79 by the liquid surface of the ink. A temperature sensor 115 is provided in the vicinity of the tank 80. Note that it is allowable that the temperature sensor 115 is configured to detect the temperature of the gas layer 78, and that the temperature sensor 115 is provided at the outside of the tank 80.

In the present embodiment, the recording part 24 is provided one tank 80. The tank 80 is positioned at a location above the head 38. Note that in the present embodiment, although the entirety of the tank 80 is positioned above the head 38, it is allowable that at least part of the tank 80 is positioned above the openings of the plurality of nozzles 39.

The ink layer 79 of the ink chamber 81 is communicated with the plurality of nozzles 39 via the ink channel 37. The ink is supplied from the ink chamber 81 to the plurality of nozzle 39, via the ink channel 37. An inlet port 83 via which the ink is poured into the ink chamber 81 is provided on an upper wall 82 of the tank 80.

As depicted in FIGS. 3 to 5, an atmosphere opening port 88 is provided on the upper wall 82 of the tank 80. The atmosphere opening port 88 communicates the gas layer 78 of the ink chamber 81 with the outside.

<Atmosphere Communicating Device 48>

Figure 6A:
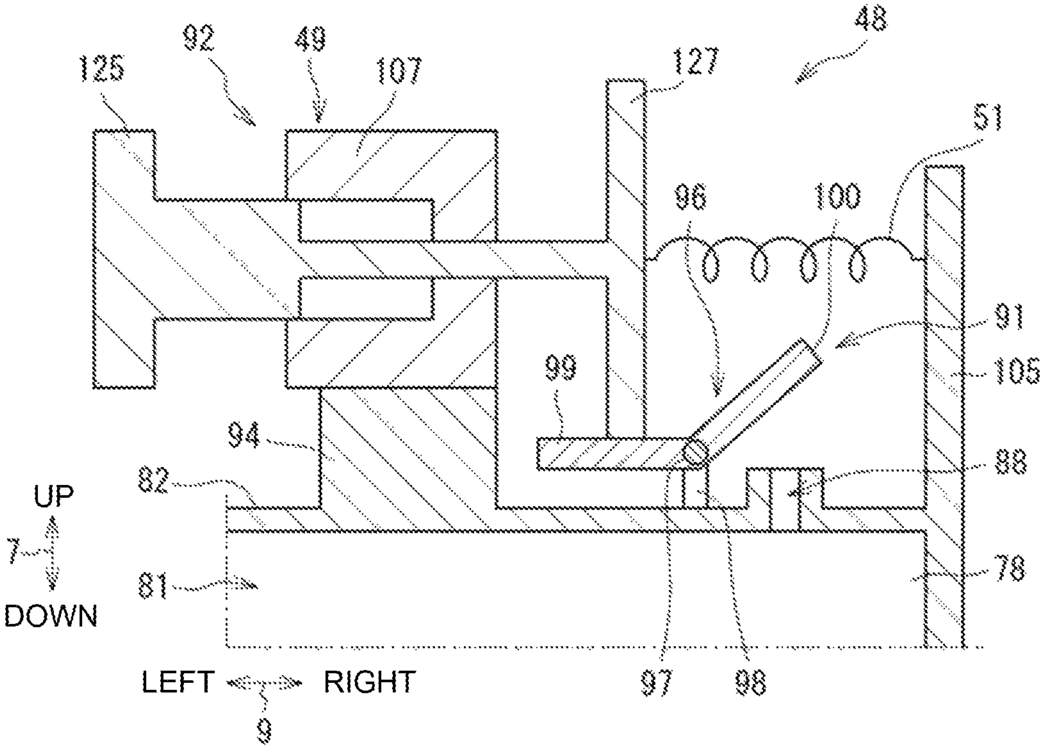
Figure 6B:
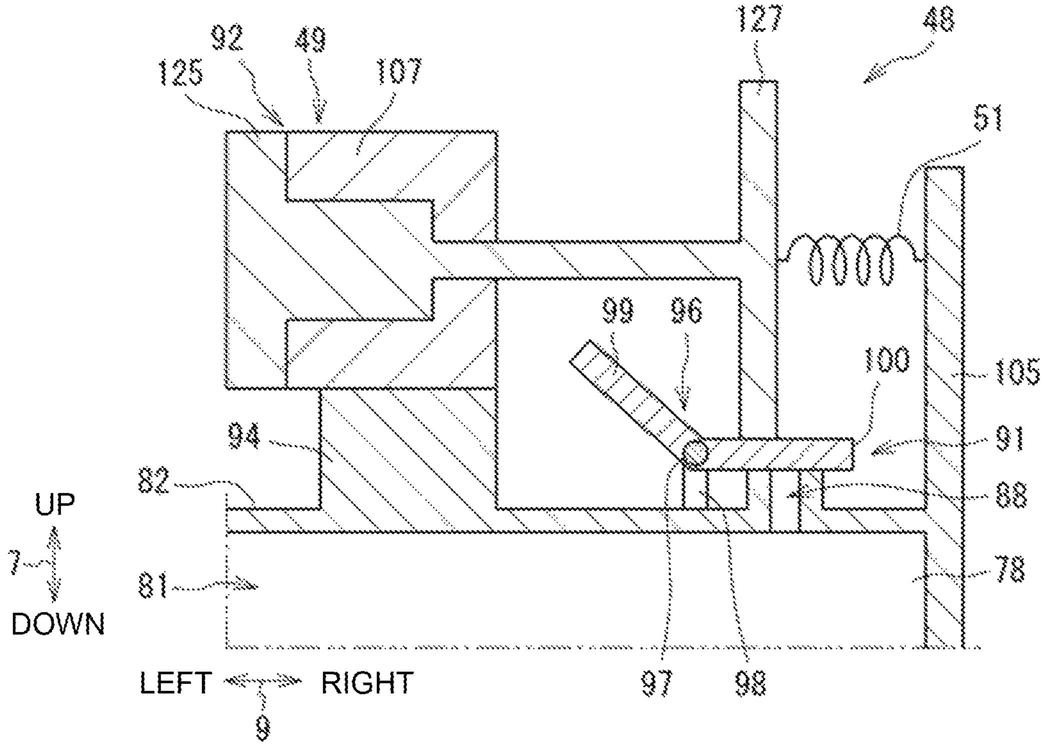

FIGS. 6A and 6B depict the atmosphere communicating device 48 of the multifunction peripheral 10 according to the first embodiment. The atmosphere communicating device 48 is arranged in the vicinity of the atmosphere opening port 88. The atmosphere communicating device 48 is provided with a valve unit 91 and a driving mechanism 92 configured to drive the valve unit 91. The valve unit 91 is configured to make the atmosphere opening port 88 to be in a communication state or in a non-communication state. The communication state is a state that the atmosphere opening port 88 is opened and that the gas layer 78 of the ink chamber 81 is communicated with the outside. The non-communication state is a state that the atmosphere opening port 88 is closed and that the gas layer 78 of the ink chamber 81 is cut off from the outside in an airtight manner.

The valve unit 91 is provided with a rotating piece 96, a rotating shaft 97 and a rotation supporting stand 98. The rotating piece 96 has a flat-plate like shape which is bent in the vicinity of the center thereof, and which has a shape of the letter "V" as seen from the front-rear direction 8. A part which extends leftward from the bent location in the rotating piece 96 is referred to as a first rotating piece 99, and another part which extends rightward from the bent location in the rotating piece 96 is referred to as a second rotating piece 100. The rotating shaft 97 projects, along the front-rear direction 8, from the boundary between the first rotating piece 99 and the second rotating piece 100.

The rotation supporting stand 98 projects upward from the upper wall 82 of the tank 80. The rotation supporting stand 98 is located on the left side with respect to the atmosphere opening port 88. The rotation supporting stand 98 extends along the front-rear direction 8 and supports the rotating shaft 97 to be rotatable. By allowing the rotating piece 96 to rotate about the rotating shaft 97, the second rotating piece 100 closes or opens (releases) the atmosphere opening port 88.

The driving mechanism 92 is provided with an electric actuator 49, and a coil spring 51 (an example of an "urging member"). The driving mechanism 92 is driven or activated by an electric power supplied from the controller 130 so as to drive the valve unit 91. The driving mechanism 92 is provided on the upper wall 82 of the tank 80.

The electric actuator 49 is supported, for example, by a spring seat 105 located on the upper wall 82 at a location on the right side with respect to the rotation supporting stand 98. The electric actuator 49 is provided with a coil part 107 and a plunger 125. A forward end of the plunger 125 is a contacting part 127. A lower end of the contacting part 127 is located in the vicinity of an upper end of the rotating shaft 97. The electric actuator 49 is a so-called electromagnetic valve.

The coil part 107 has an electromagnetic coil in the inside thereof. In the plunger 125, a shaft part inserted into the coil part 107 is magnetic, and is movable along the left-right direction 9 with respect to the coil part 107. In a case that an induction field is generated in the coil part 107 by the turning on of the power, the plunger 125 moves rightward with respect to the coil part 107.

As depicted in FIGS. 6A and 6B, the spring seat 105 projects upward in the vicinity of a right end of the upper wall 82 of the tank 80. The spring seat 105 is located on the right side with respect to the atmosphere opening port 88. The coil spring 51 extends along the left-right direction 9 by being supported by the spring seat 105 and the contacting part 127 of the electric actuator 49. The coil spring 51 urges the contacting part 127 leftward.

The electric actuator 49 is supported by a supporting stand 94 which is provided on the upper wall 82, at a location on the left side with respect to the atmosphere opening port 88.

In a state that the electric power is not supplied to the coil part 107, the plunger 125 is urged leftward by the coil spring 51 and is in a state that the plunger 125 is moved leftmost with respect to the coil part 107, as depicted in FIG. 6A. In this state, the contacting part 127 is moved to the left side with respect to the rotating shaft 97, and makes contact with the first rotating piece 99. By the first rotating piece 97 making contact with the contacting part 127, the rotating piece 96 is in a state of being rotated most counterclockwise, thereby allowing the second rotating piece 100 to be separated from the atmosphere opening port 88.

In a case that the electric power is supplied to the coil part 107, the induction field generated in the coil part 107 causes the plunger 125 to be in a state of being moved rightward with respect to the coil part 107, against the urging force of the coil spring 51, as depicted in FIG. 6B. In this state, the contacting part 127 is located on the right side with respect to the rotating shaft 97, and makes contact with the second rotating piece 100. With this, the rotating piece 96 is in a state of being rotated most clockwise, thereby allowing the second rotating piece 100 to close the atmosphere opening port 88.

<Cap 70>

As depicted in FIGS. 3 to 5, the cap 70 is located at a maintenance position (a position depicted in FIGS. 3 and 4) which is at the outside of the platen 42 in the left-right direction 9, and on the right side with respect to the medium passing area 36 in the present embodiment. In a case that the carriage 40 is at the maintenance position, the cap 70 is located below the carriage 40 and faces or is opposite to the carriage 40 (specifically, the nozzles 39 of the head 38). The cap 70 is a member having a box-like shape of which upper part is opened. The cap 70 is made of an elastic member such as rubber, etc.

The cap 70 is supported by a frame 46 via a publicly known movable mechanism 71, and the cap 70 is movable upward and downward by the movable mechanism 71 to which a driving force from a cap driving motor 104 (see FIG. 7) is applied. The frame 46 is located on the right side with respect to the platen 42, and is a member having a plate-like shape spreading in the front-rear direction 8 and the left-right direction 9. The movable mechanism 71 is, for example, a mechanism which uses a ball spring, a mechanism which uses a cam, etc.

The cap 70 is movable to a covering position which is depicted in FIG. 3 and at which the cap 70 covers the nozzles 39, and to a separate position which is depicted in FIG. 4 and at which the cap 70 is separated from the nozzles 39. As depicted in FIG. 3, an upper end of the cap 70 at the covering position is brought into a pressurized contact with the lower surface 68 of the head 38 from therebelow. With this, the cap 70 is in a state that the cap 70 covers the plurality of nozzles 39, formed in the lower surface 68 of the head 38, from therebelow. In this situation, a cap internal space 76 (an example of an "internal space" of the cap) is formed by the cap 70 and the lower surface 68 of the head 38. The separated position is a position below the covering position. At the separated position, the cap 70 is separated from the lower surface 68 of the head 38. A cap sensor 147 (see The. 7) is configured to detect that the cap 70 is at the covering position.

A through hole 72 (an example of a "cap opening port") is provided on a bottom surface 70A of the cap 70. One end of a tube 73 is connected to the through hole 73. The tube 73 is a resin tube having a flexibility. The one end of the tube 73 is connected to the through hole 73 to thereby form a cap communicating channel 74 communicating the cap internal space 76 with the outside via the through hole 72. The other end of the tube 73 is connected to a cap valve unit 67 configured to make the through hole 72 or the cap communicating channel 74 to be in a communication state or a non-communication state.

The cap valve unit 67 makes the through hole 72 or the cap communicating channel 74 to be in the communication state or the non-communication state. The communication state is a state that the through hole 72 or the cap communicating channel 74 communicates the cap internal space 76 with the outside. The non-communication state is a state that the through hole 72 or the cap communicating channel 74 is closed.

The cap internal space 76 is connected to a pump 77. The pump 77 applies a suction pressure to the cap internal space 76. In a case that the pump 77 is driven in a state that the cap 70 is positioned at the covering position and covers the nozzles 39 and that the cap valve unit 67 is in the communication state, the pressure in the cap internal space 76 becomes negative, and any foreign matter is sucked out, together with the ink, from the nozzles 39 into the cap internal space 76.

<Seat Sensor 120>

As depicted in FIG. 2, the sheet sensor 120 is provided on the upstream in the conveying orientation 15 with respect to the conveying roller pair 59 in the conveying route 65. The sheet sensor 120 is provided with a shaft 121, a detector 122 rotatable about the shaft 121, and an optical sensor 123 having a light emitting element and a light receiving element which receives a light emitted from the light emitting element.

<Temperature Sensor 115>

As depicted in FIG. 2, the temperature sensor 115 is provided on the inside of the tank 80. The temperature sensor 115 detects the temperature inside the tank 80.

<Rotary Encoder 75>

The rotary encoder 75 depicted in FIG. 7 is constructed of an encoder disk which is provided on a shaft of the conveying motor 101 (see FIG. 7) and which is configured to rotate together with the conveying motor 101, and an optical sensor. The rotary encoder 75 calculates a rotating amount of the conveying motor 101 based on a generated pulse signal.

<Controller 130 and Memory 140>

In the following, the configurations of the controller 130 and the memory 140 will be explained, with reference to FIG. 7. The controller 130 controls the entire operation of the multifunction peripheral 10. The controller 130 is provided with a CPU 131 and an ASIC 135. The memory 140 is provided with a ROM 132, a RAM 133 and an EEPROM 134. The CPU 131, the ASIC 135, the ROM 132, the RAM 133 and the EEPROM 134 are connected to one another by an internal bus 137.

The ROM 132 stores therein a program for causing the CPU 131 to control a various kinds of operations, etc. The RAM 133 is used as a storage area temporarily storing data and/or a signal to be used in a case that the CPU 131 executes the program, or as a working area for data processing. The EEPROM 134 stores a setting and/or a flag to be held or stored even after the power source is switched off.

The conveying motor 101, the carriage driving motor 103 and the cap driving motor 104 are connected to the ASIC 135. Driving circuits each of which controls one of the respective motors are installed in the ASIC 135. The CPU 131 outputs driving signals each of which is for rotating one of the respective motors to one of the driving circuits corresponding to one of the respective motors. Each of the driving circuits outputs a driving voltage, in accordance with the driving signal obtained from the CPU 131, to one of the motors corresponding thereto. With this, the corresponding motor is rotated. Namely, the controller 130 controls the conveying motor 101 to cause the conveying roller pair 59 and the discharging roller pair 44 to convey the sheet 12. Further, the controller 130 drives the carriage driving motor 103 to move the carriage 40. Furthermore, the controller 130 controls the cap driving motor 104 so as to drive the movable mechanism 71 to thereby move the cap 70.

Further, the sheet sensor 120 is connected to the ASIC 135. The controller 130 detects whether or not the sheet 12 is present at an arrangement position where the sheet sensor 120 is arranged.

Furthermore, the temperature sensor 115 is connected to the ASIC 135. The controller 130 detects an environmental temperature of the tank 80 based on a result of output of the temperature sensor 115. The controller 130 calculates a change in the temperature from the information received from the temperature sensor 115. The controller 130 drives the driving mechanism 92 based on the calculated value.

Moreover, the optical sensor of the rotary encoder 75 is connected to the ASIC 135. The controller 130 calculates a rotating amount of the conveying motor 101 based on an electric signal received from the optical sensor of the rotary encoder 75.

The controller 130 recognizes the position of the sheet 12 based on the rotating amount of the conveying motor 101 after the electric signal received from the sheet sensor 120 changes from a signal of a low level to a signal of a high level (namely, after a detection that a forward end of the sheet 12 has reached the arrangement position of the sheet sensor 120 has been made).

Further, the encoder 35 is connected to the ASIC 135. The controller 130 recognizes the position of the carriage 40 and/or whether or not the carriage 40 is moved, based on a pulse signal received from the encoder 35.

Further, the piezoelectric actuator 49 is connected to the ASIC 135. The controller 130 supplies the electric power to the coil part 107 of the piezoelectric actuator 49 to thereby drive the plunger 125.

<Control of Valve Unit 91 by Controller 130>

In the multifunction peripheral 10 configured as described above, the control of the valve unit 91 is executed by the controller 130. In the following, an operation of the valve unit 91 whereby the valve unit 91 changes a posture thereof between the non-communication stated and the communication state by the rotation of the rotating piece 96 will be explained with reference to the flow charts of FIGS. 8 to 10.

Figure 8:
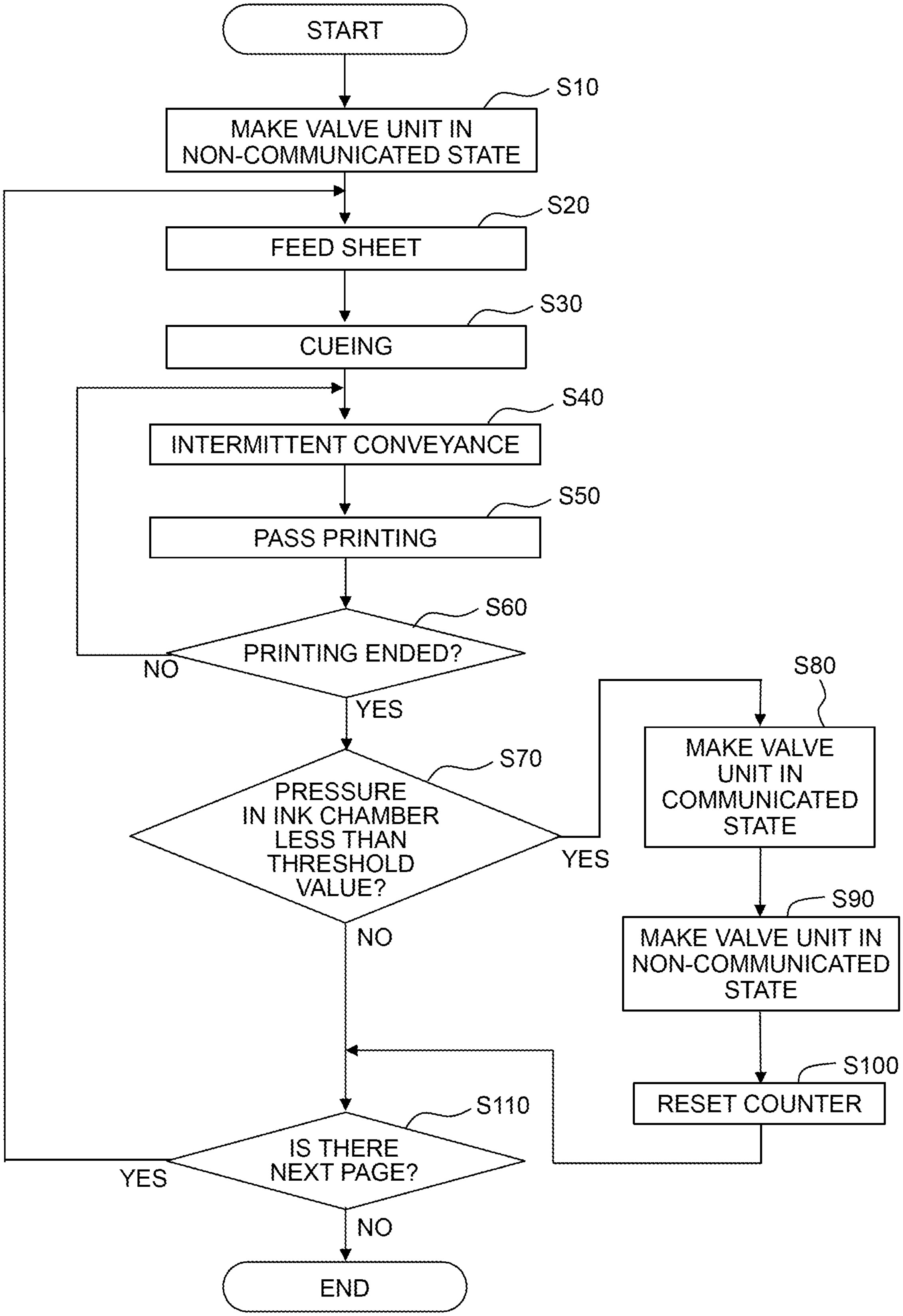
FIG. 8 is a flowchart for explaining a control of the valve unit during a normal printing.

FIG. 8 depicts a control of the valve unit 91 at a time of a normal printing. As depicted in FIG. 8, the controller 130 executes steps S10 to S110. Firstly, in response to a receipt of input of a print start via the operating part 17, or in response to a receipt of print data from an external information apparatus, the controller 130 drives the electric actuator 49 to thereby make the valve unit 91 to be in the non-communication state (step S10). In this situation, the pressure (air pressure) of the ink chamber 81 of the tank 80 is the atmospheric pressure. Next, the controller 130 drives the feeding motor 102 to thereby feed the sheet 12 from the feed tray 20 to the conveying route 65 (step S20). The forward end, of the sheet 12 fed from the feed tray 20, is detected by the sheet sensor 120. In response to the detection of the forward end of the sheet 12 by the sheet sensor 120, the controller 130 drives the conveying motor 101 to thereby perform cueing (initial setting) of positioning the forward end of the sheet 12 at a location below the recording part 24, by the conveying roller pair 59 (step S30).

The controller 130 conveys the cued sheet 12 intermittently at a location immediately below the recording part 24

(step S40); in a case that the sheet 12 is stopped, the controller 130 drives the carriage driving motor 103 so as to discharge the ink from the nozzles 39 of the head 38 while moving the carriage 40, thereby performing a pass printing (step S50). Until the printing to the entirety of the sheet 12 is ended (step S60: NO), the controller 130 repeats the intermittent conveyance (step S40) and the pass printing (step S50). Due to the pass printing, the ink is reduced in the tank 80 and the pressure (air pressure) inside the ink chamber 81 is lowered from the atmospheric pressure. In a case that the printing with respect to the entirety of the sheet 12 is ended (step S60: YES), the controller 130 determines as to whether or not the pressure inside the ink chamber 81 is less than a threshold value previously set. Specifically, the controller 130 counts and accumulates an amount of the ink discharged with respect to the sheet 12, and determines as to whether or not a counted value has reached a threshold value stored in the memory 140. The threshold value is previously set as a value to such an extent that the meniscus formed in the nozzle 39 is not destroyed.

In a case that the controller 130 determines that the pressure inside the ink chamber 81 is not less than the threshold value (step S70: NO), the controller 130 determines as to whether or not there is a next page for which the image recording is to be performed (step S110). In a case that the controller 130 determines that there is a next page for which the image recording is to be performed (step S110: YES), the controller 130 causes a sheet 12 to be conveyed from the feed tray 20 to the conveying route 65 (step S20). On the other hand, in a case that the controller 130 determines that the pressure inside the ink chamber 81 is less than the threshold value (step S70: YES), the controller 130 stopes the supply of the electric power to the electric actuator 49 and makes the valve unit 91 to be in the communication state (step S80). In a case that the valve unit 91 is in the communication state, the pressure inside the ink chamber 81 becomes to be the atmospheric pressure. Afterwards, the controller 130 drives the electric actuator 49 to thereby make the valve unit 91 to be in the non-communication state (step S90). After making the valve unit 91 to be in the non-communication state, the controller 130 resets the accumulated count values (step S100). On the other hand, in a case that the controller 130 determines that there is no next page for which the image recording is to be performed (step S110: NO), the controller 130 positions the carriage 40 at the maintenance position (on the right side with respect to the medium passing area 36), covers the head 38 with the cap 70, and ends the printing operation.

Next, an operation of the valve unit 91, after a power button of the multifunction peripheral 10 is pressed and the multifunction peripheral 10 is switched to a power saving-waiting state (hereinafter also referred to as a "waiting state") will be explained.

The multifunction peripheral 10 has, for example, a power switch configured to switch a state of the multifunction peripheral 10 to a power supply state in which the electric power is supplied to the multifunction peripheral 10 or to a non-power supply state in which the electric power is not supplied to the multifunction peripheral 10. Further, the multifunction peripheral 10 has a power source button by a so-called soft switch configured to switch the multifunction peripheral 10 to a waiting state or a stand-by state in a state that the electric power is supplied to the multifunction peripheral 10. In a case that the power source switch is operated by an user in a state that the electric power is not supplied to the multifunction peripheral 10, the controller 130 starts the power supply to the multifunction peripheral 10 and to make the multifunction peripheral 10 to be in the stand-by state. In a case that the multifunction peripheral 10 is in the stand-by state, the controller 130 drives the respective driving sources in accordance with the input by the user. In a case that the multifunction peripheral 10 is in the stand-by state and in accordance with an operation of pressing the power source button performed by the user, the controller 130 switches the multifunction peripheral 10 into the waiting state as indicated below. In a case that the multifunction peripheral 10 is in the waiting state, the controller 130 stops the electric power supply to the respective driving sources, and waits for the input from the user. In a case that the electric power switch is turned on and the electric power is supplied to the multifunction peripheral 10, the controller 130 makes the multifunction peripheral 10 to be in the stand-by state, and makes each of the respective driving sources to be in an operable state.

Figure 9:
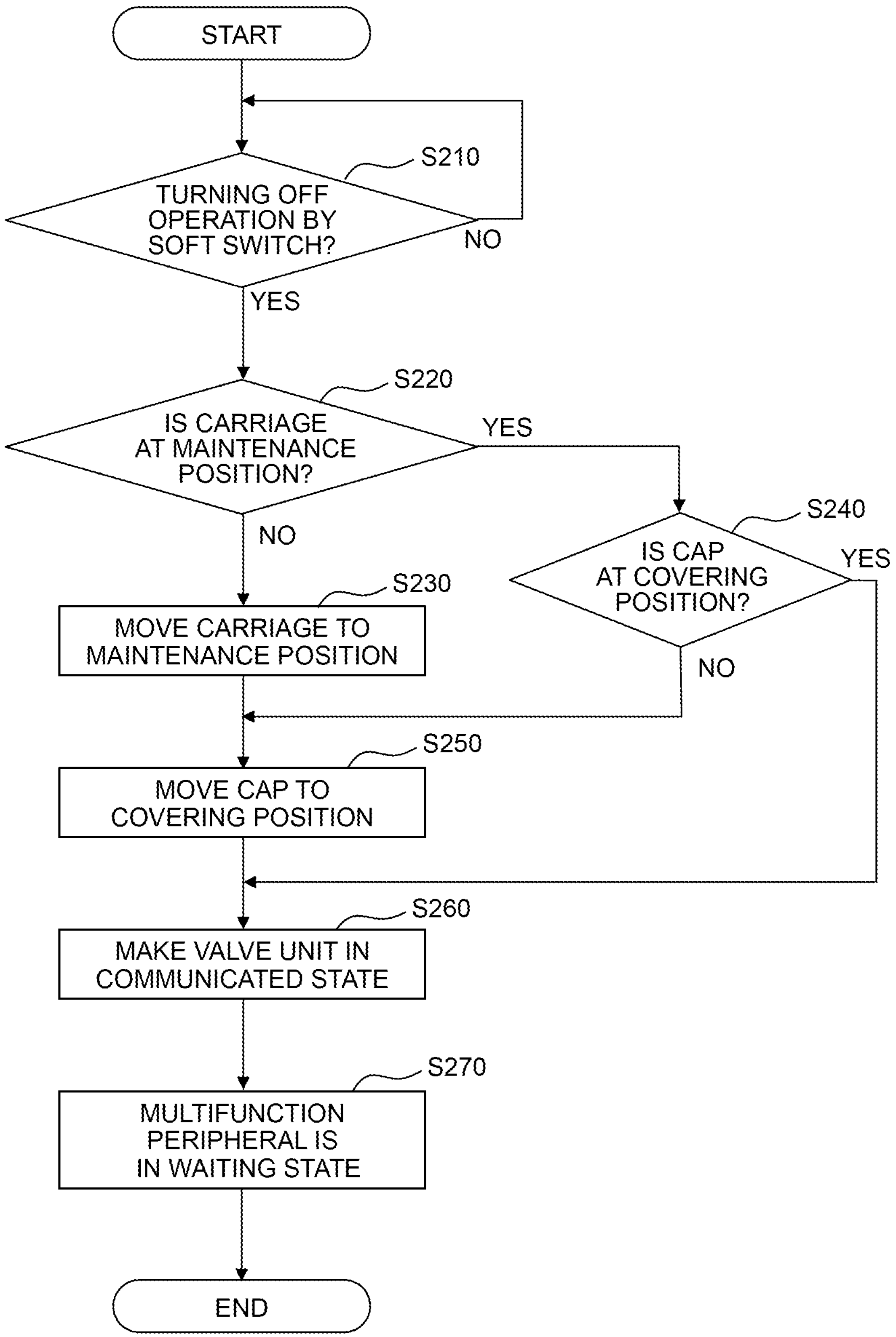
FIG. 9 is a flowchart for explaining an operation of the valve unit in a case that a power source of the multifunction peripheral is turned off by a soft switch.

FIG. 9 indicates an operation of the valve unit 91 in a case that the power source of the multifunction peripheral 10 is turned off by the soft switch and the multifunction peripheral 10 is made to be in the waiting state, and the controller 130 executes steps S210 to S270.

Firstly, the controller 130 determines as to whether or not the power source button is turned off in the operating part 17 (step S210). In accordance with an operation of turning off the power source button (step S210: YES), the controller 130 determines as to whether or not the carriage 40 is at the maintenance position, based on the output of the encoder 35 (step S220). In a case that there is no operation of turning off the power source button (step S210: NO), the controller 130 stands by until the operation of turning off the power source button is performed.

In accordance with the determination made by the controller 130 that the carriage 40 is not at the maintenance position (step S220: NO), the controller 130 drives the carriage driving motor 103 to thereby causes the carriage 40 to move to the maintenance position (step S230). Afterwards, the controller 130 causes the cap 70 to move to the covering position (step S250), stops the electric power supply to the electric actuator 49 to thereby make the valve unit 91 to be in the communication state (step S260). On the other hand, in accordance with the determination made by the controller 130 that the carriage 40 is at the maintenance position (step S220: YES), the controller 130 determines as to whether or not the cap 70 is at the covering position, based on the signal from the cap sensor 147 (step S240). In a case that the controller 130 determines that the cap 70 is not at the covering position (step S240: NO), the controller 130 drives the cap driving motor 104 to thereby cause the cap 70 to move to the covering position (step S250). Afterwards, the controller 130 stops the electric power supply to the electric actuator 49, under a condition that the cap 70 is at the covering position (step S240: YES), to thereby make the valve unit 91 to be in the communication state (step S260).

After the controller 130 makes the valve unit 91 to be in the communication state, the controller 130 makes the multifunction peripheral 10 to be in the waiting state (step S270), and ends the operation of turning off the power source. Here, the phrase "waiting state" means a state that the display, the LED, etc., of the operating part 17 is/are not allowed to emit light, and that the power consumption is restricted, until any operation to the operating part 17 is received and/or any data is received from the external information apparatus.

Next, an explanation will be made regarding an operation in a case that the multifunction peripheral 10 is in the waiting state.

Figure 10A:
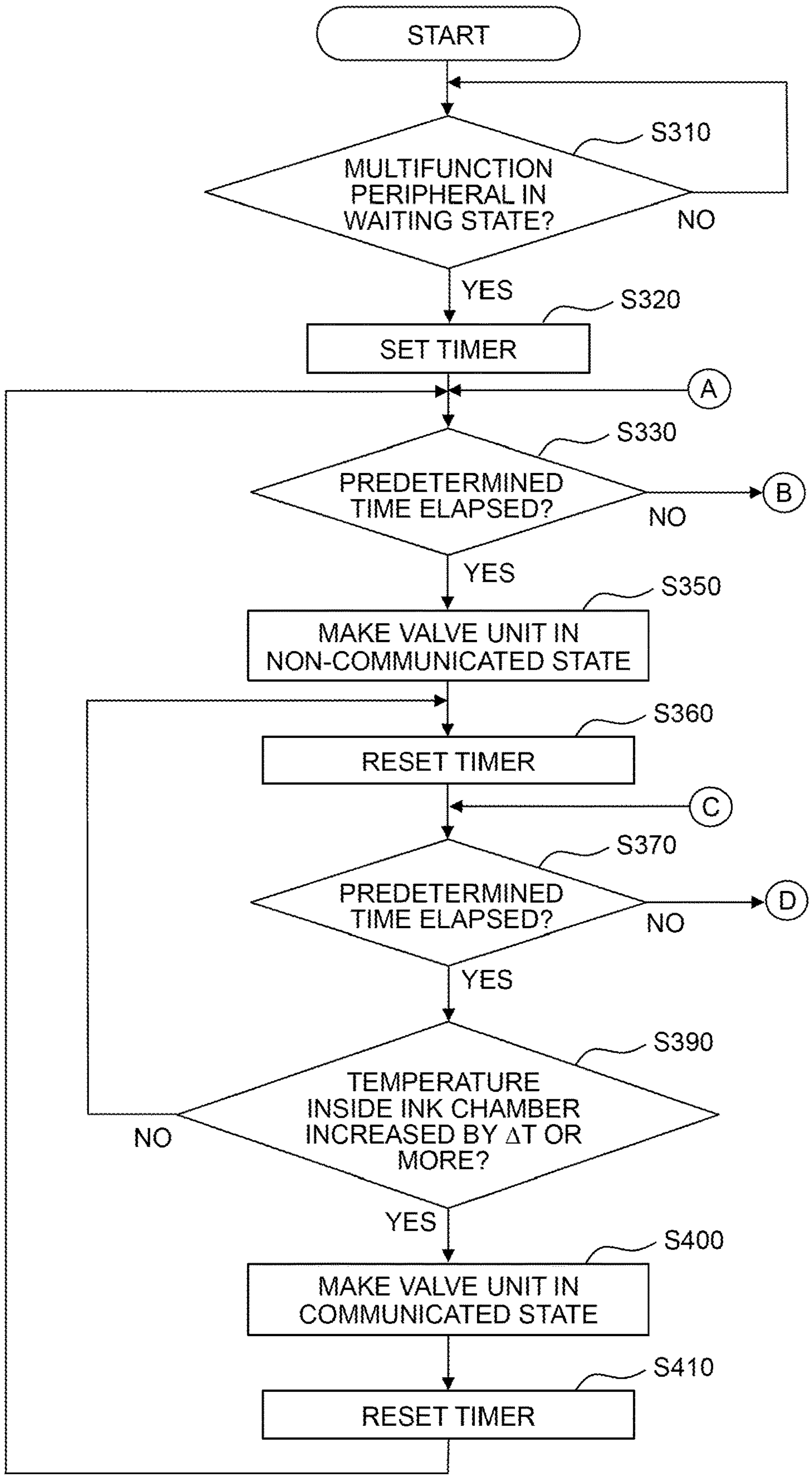
FIGS. 10A and 10B indicate a flowchart for explaining an operation of the valve unit after the multifunction peripheral has been made to be in a waiting state.
Figure 10B:
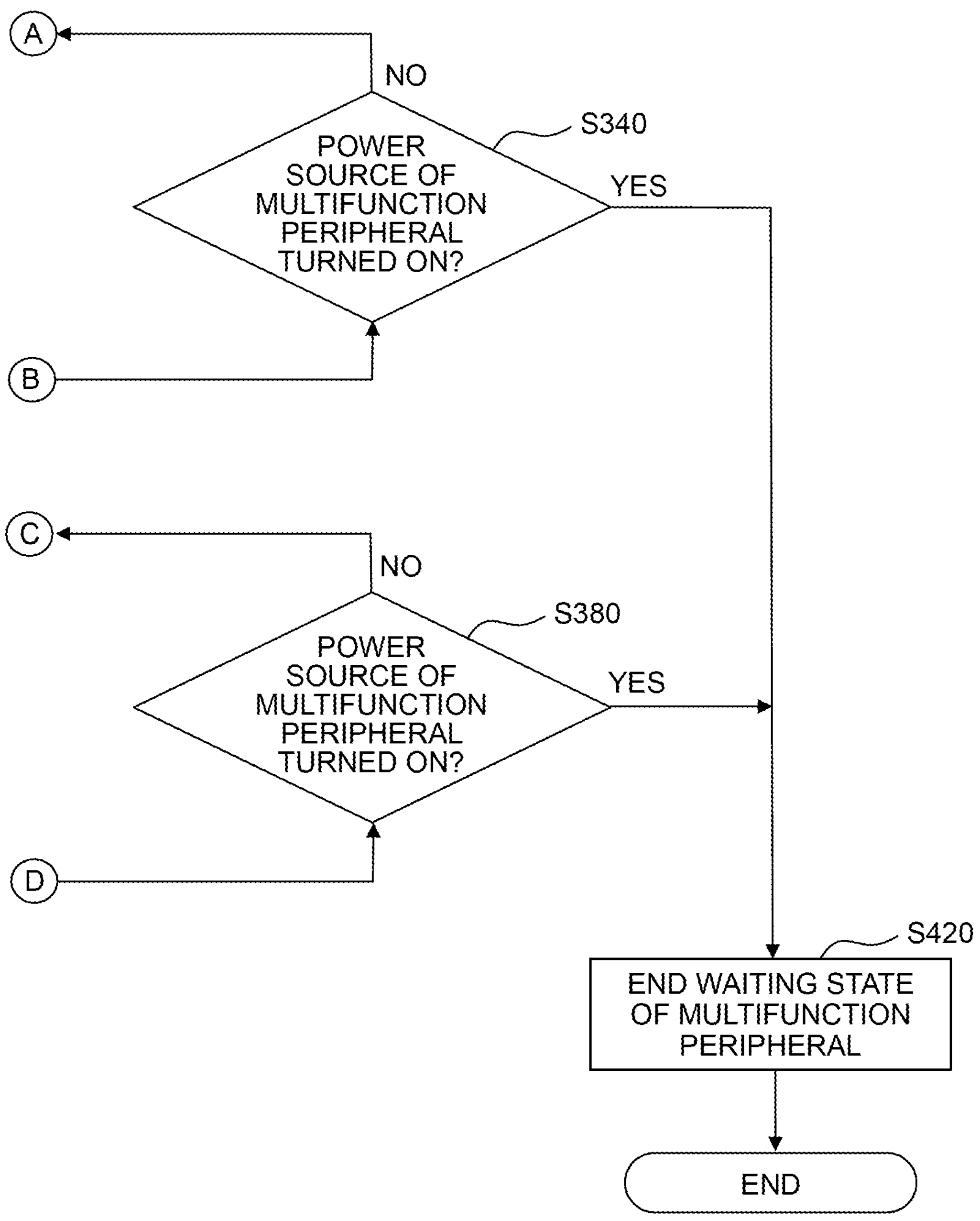

FIGS. 10A and 10B indicate an operation of making, in the waiting state, the valve unit 91 to be in the non-communication state from the communication state, based on a first condition, in order to suppress evaporation of the ink due to, for example, any rise in the temperature (steps S310 to S350), after the valve unit 91 has been made to be in the non-communication state from having been in the communicated state. Further, FIGS. 10A and 10B also indicate an operation of making the valve unit 91 to be in the communication state from the non-communication state, based on a second condition, in order to suppress leakage of the ink due to, for example, any rise in the temperature (steps S360 to S410), after the valve unit 91 has been made to be in the non-communication state from the communication state based on the first condition.

As depicted in FIGS. 10A and 10B, although the controller 130 executes steps S310 to S420, control from steps S310 to S350 by which the controller 130 makes the valve unit 91 to be in the non-communication state from the communication state will be explained firstly.

The controller 130 determines as to whether or not the multifunction peripheral 10 in which the valve unit 91 is in the communication state is in the waiting state (step S310). In accordance with the determination by the controller 130 that the multifunction peripheral 10 is in the waiting state (step S310: YES), the controller 130 resets a timer and starts counting of an elapsed time elapsed since the multifunction peripheral 10 has been made to be in the waiting state (step S320). The timer is driven, for example, based on an internal clock possessed by the controller 130. On the other hand, in a case that the controller 130 determines that the multifunction peripheral 10 is not in the waiting state (step S310: NO), the controller 130 continues performing the determination until the multifunction peripheral 10 is in the waiting mode.

Further, the controller 130 determines as to whether or not the current time, after the time has been set, is a predetermined time previously set in the memory 140 (step S330). In a case that the controller 130 determines that the predetermined time has elapse at the current point of time (step S330: YES), the controller 130 drives the electric actuator 149 so as to make the valve unit 91 to be in the non-communication state from the communication state.

The controller 130 resets the timer (step S360) after having made the valve unit 91 to be in the non-communication state. Further, the controller 130 obtains temperature information, at the time of resetting the timer, from the temperature sensor 115, and stores the temperature information in the memory 140. In accordance with the determination made by the controller 130 in step S330 that the predetermined time has not elapsed (step S330: NO), the controller 130 determines as to whether or not an ON operation of the power source button has been received in the operating part 17 of the multifunction peripheral 10 (step S340). In a case that the controller 130 determines that the ON operation has not been received in the power source button of the multifunction peripheral 10 (step S340: NO), the controller 130 continuously determines as to whether or not the predetermined time has elapsed (step S330). On the other hand, in accordance with the determination made by the controller 130 that the ON operation has been received in the power source button of the multifunction peripheral 10 (step S340: YES), the controller 130 ends the waiting state of the multifunction peripheral 10 (step S420).

Next, an explanation will be made regarding the control in steps S360 to S410 performed by the controller 130 by which the valve unit 91 is made to be again in the communication state from the non-communication state.

After the controller 130 makes the valve unit 91 to be in the non-communication state (step S350) and resets the timer (step S360), the controller 130 determines as to whether or not a predetermined time previously set has elapsed (step S370). In accordance with the determination made by the controller 130 in step S370 that the predetermined time previously set has elapsed (step S370: YES), the controller 130 determines as to whether or not the temperature inside the ink chamber 81 is increased by not less than ΔT with respect to a previously set temperature (step S390). Specifically, the controller 130 obtains the temperature information from the temperature sensor 115, and calculates a difference in temperature between the obtained temperature information and the temperature information stored in the memory 140. Further, the controller 130 determines whether or not the calculated difference in temperature is not less than the ΔT. In accordance with the determination made by the controller 130 that the temperature inside the ink chamber 81 is increased by not less than the ΔT (step S390: YES), the controller 130 stopes the electric power supply to the electric actuator 49 to thereby make the valve unit 91 to be in the communication state from the non-communication state (step S400).

After the controller 130 makes the valve unit 91 to be in the communication state, the controller 130 resets the timer (step S410), and returns the procedure to step S330. On the other hand, in accordance with the determination made by the controller 130 that the difference in temperature is less than the Δt (step S390: NO), the controller 130 resets the timer (step S360), and determines again as to whether or not the predetermined time has elapsed (step S370). In step S370, in accordance with the determination made by the controller 130 that the predetermined time has not elapsed (step S370: NO), the controller 130 determines as to whether or not the ON operation of the power source button has been received (step S380). In accordance with the determination made by the controller 130 that the ON operation of the power source button has not been received (step S380: NO), the controller 130 continues performing the determination as to whether or not the predetermined time has elapsed (step S370). On the other hand, in accordance with the determination made by the controller 130 that the ON operation of the power source button has been received (step S380: YES), the controller 130 ends the waiting state of the multifunction peripheral 10.

Next, an explanation will be made regarding an operation in a case that a plug of the multifunction peripheral 10 is removed from the receptacle (plug socket).

As depicted in FIG. 6A, in the state that the electric power is not supplied to the coil part 107, the plunger 125 is urged leftward by the coil spring 51. In this situation, the rotating piece 96 is separated from the atmosphere opening port 88, thereby making the valve unit 91 to be in the communication state. In a case that the power source plug of the multifunction peripheral 10 is removed from the receptacle in the communication state, the valve unit 91 is maintained to be in the state of being urged leftward by the coil spring 51. Accordingly, the valve unit 91 is maintained to be in the communication state.

As depicted in FIG. 6B, in a state that the electric power is supplied to the coil part 107, the plunger 125 is moved rightward against the urging force of the coil spring 51. In this situation, the rotating piece 96 closes the atmosphere opening port 88, thereby making the valve unit 91 to be in the non-communication state. In a case that the power source plug of the multifunction peripheral 10 is removed from the receptacle in the non-communication state, the electric power supply to the coil part 107 is stopped, which in turn makes the plunger 125 to be urged leftward by the coil spring 51, thereby making the valve unit 91 to be in the communication state from the non-communication state.

According to the first embodiment, the valve unit 91 is made to be in the communication state in a case that the power source of the multifunction peripheral 10 is turned off. Accordingly, it is possible to lower the occurrence of such a situation that the meniscus formed in the nozzle 39 is destroyed and that the liquid leaks out from the head 38, even if there is any change in the external environment such that the pressure inside the tank 80 is increased due to any increase in the temperature, etc.

Further, according to the first embodiment, the valve unit 91 is made to be in the non-communication state in the case that the predetermined time has elapsed since the power source of the multifunction peripheral 10 has been turned off and the multifunction peripheral 10 has been made to be in the waiting state. Accordingly, the occurrence of such a situation that the ink evaporates from the tank 80 through the atmosphere opening port 88 and/or that the ink flows out from the atmosphere opening port 88 due to the moving of the multifunction peripheral 10 is lowered.

Furthermore, according to the first embodiment, in the waiting state of the multifunction peripheral 10, the valve unit 91 is made to be in the communication state, even if there is any change in the external environment such that the pressure inside the tank 80 is increased due to any increase in the temperature, etc., after the valve unit 91 has been made to be in the non-communication state. Thus, it is possible to lower the occurrence of such a situation that the meniscus formed in the nozzle 39 is destroyed and that the liquid leaks out from the head 38.

Moreover, according to the first embodiment, in a case that the carriage 40 is moved to the maintenance position, the cap 70 moves to the covering position so as to cover the nozzles 39. This lowers the evaporation of the ink from the nozzle 39. In a case that the power source of the multifunction peripheral 10 is turned off, the cap valve unit 67 is in the communication state. Accordingly, it is possible to lower the occurrence of such a situation that the air inside the cap internal space 76 enters into the nozzle 39 and destroys the meniscus formed in the nozzle 39, even if there is any change in the external environment such that the pressure inside the cap internal space 76 is increased due to any increase in the temperature, etc.

<First Modification of First Embodiment>

Figure 11:
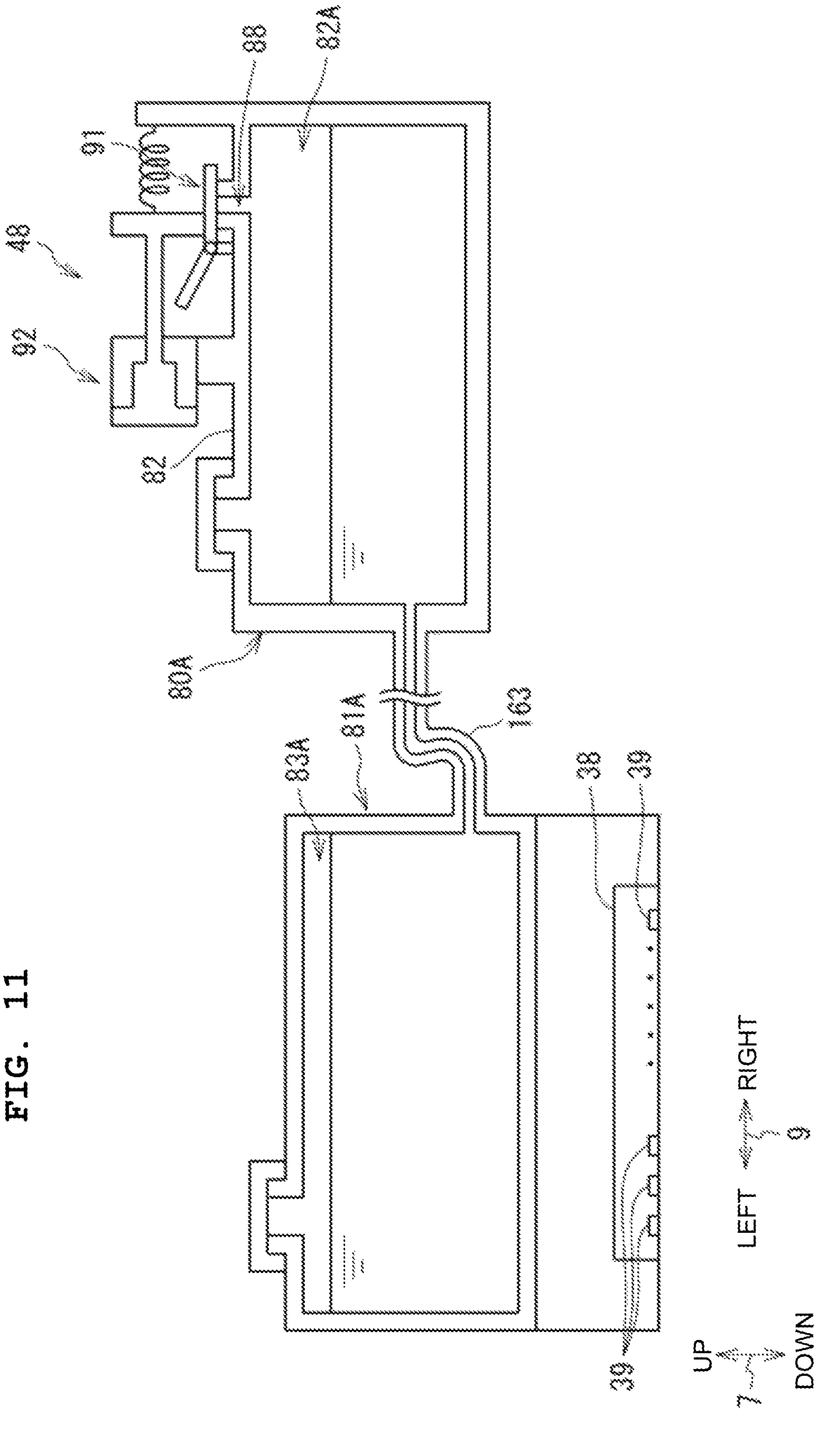
FIG. 11 is a cross-sectional view of a multifunction peripheral according to a first modification of the first embodiment.

In the first embodiment, although the explanation has been made regarding the case that one tank 80 is provided on the recording part 24, the tank 80 may be, for example, constructed of a first storing chamber 80A and a second storing chamber 81A, as depicted in FIG. 11.

The first storing chamber 80A has a first ink chamber 82A in the inside thereof. Further, the second storing chamber 81A has a second ink chamber 83A in the inside thereof. The first ink chamber 82A is connected to the second ink chamber 83A by an ink flow channel 163 such that the ink is allowed to flow therein. Further, the second ink chamber 83A is connected to the head 38 such that the ink is allowed to flow therein.

The ink flow channel 163 is a tubular member having a space in the inside thereof. The space inside the ink flow channel 163 communicates the first ink chamber 82A and the second ink chamber 83A via through holes provided on the first storing chamber 80A and the second storing chamber 81A, respectively.

An atmosphere opening port 88 of the first storing chamber 80A is provided with the atmosphere communicating device 48. The valve unit 91 is driven by the driving mechanism 92 so as to make the atmosphere opening port 88 to be in the communication state or the non-communication state.

<Second Modification of First Embodiment>

In the first embodiment, although the explanation has been made regarding the case that the tank 80 is provided with the atmosphere opening port 88 configured to communicate the gas layer 78 of ink chamber 81 with the outside, the present disclosure is not limited to or restricted by this. It is allowable that an atmosphere communicating channel 90B is provided, as a configuration for communicating the gas layer of the tank with the outside. The atmosphere communicating channel 90B is constructed as a channel up to the atmosphere opening port 88. Note that the atmosphere opening channel 90B may be constructed as a channel extending outward from the atmosphere opening port 88.

Figure 12A:
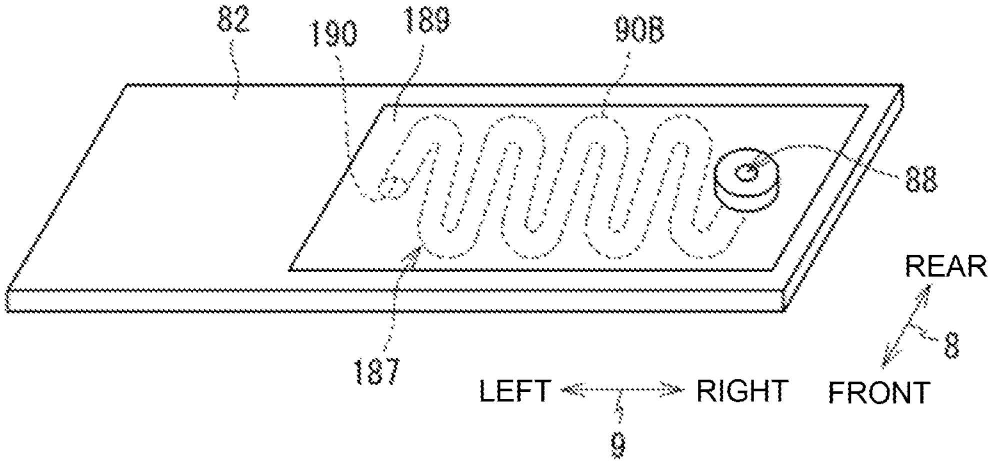
FIG. 12A is a view depicting a labyrinth structure provided on an upper wall of a tank of a multifunction peripheral according to a second modification of the first embodiment.

In the second modification, the atmosphere communicating channel 90B is configured as a channel up to the atmosphere opening port 88, and has a labyrinth structure 187, as depicted in FIG. 12A.

The atmosphere communicating channel 90B is a communicating channel for communicating an ink chamber (not depicted in the drawings) with the outside. In other words, the atmosphere communicating channel 90B is a communicating channel for opening or releasing the ink chamber to the atmosphere.

The atmosphere communicating channel 90B is formed to have a groove shape in the upper wall 82, and an upper side of the atmosphere communicating channel 90B is closed by a film 189. One end of the atmosphere communicating channel 90B is communicated with the ink chamber via an opening 190 formed in the upper wall 82. The other end of the atmosphere communicating channel 90B is communicated with the outside via the atmosphere opening port 88 formed in the upper wall 82. In the second modification, the atmosphere communicating channel 90B has the labyrinth structure 187 which extends along the left-right direction 9 while repeating a U-turn in the front-rear direction 8.

<Third Modification of First Embodiment>

In the first embodiment, although the atmosphere opening port 88 is opened to the outside in the communication state, it is allowable that the atmosphere opening port 88 has a semipermeable membrane 188.

Figure 12B:
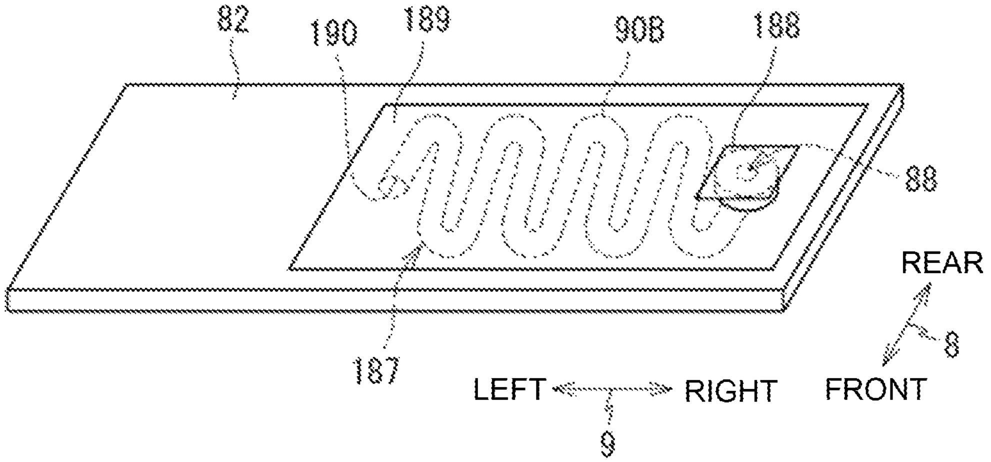
FIG. 12B is a view depicting a semipermeable membrane provided on an atmosphere opening port of a multifunction peripheral according to a third modification of the first embodiment.

For example, as depicted in FIG. 12B, the semipermeable membrane 188 is provided on a side of the other end of the atmosphere communicating channel 90B which is communicated with the outside, such that the semipermeable membrane 188 closes the atmosphere opening port 88.

The semipermeable membrane 188 is a porous membrane having minute holes blocking passage of the ink and allowing passage of the air. For example, the semipermeable membrane 188 is formed of a fluorine resin such as a polytetrafluoroethylene, a polychlorotrifluoroethylene, a tetrafluoroethylene-hexafluoropropylene copolymer, a tetrafluoroethylene-perfluoroalkyl vinyl ether copolymer, a tetrafluoroethylene-ethylene copolymer, etc. With this, the ink stored in the ink chamber is blocked by the semipermeable membrane 188, and thus does not outflow to the outside of the tank via the atmosphere communicating channel 90B and the atmosphere opening port 88. On the other hand, the air is capable of freely moving between the ink chamber and the outside of the tank.

Second Embodiment

In a second embodiment, an explanation will be given regarding a configuration in which the tank 80 is provided with an atmosphere communicating device 48C which is constructed to include two electric actuators arranged in series, rather than the atmosphere communicating device 48.

Figure 13A:
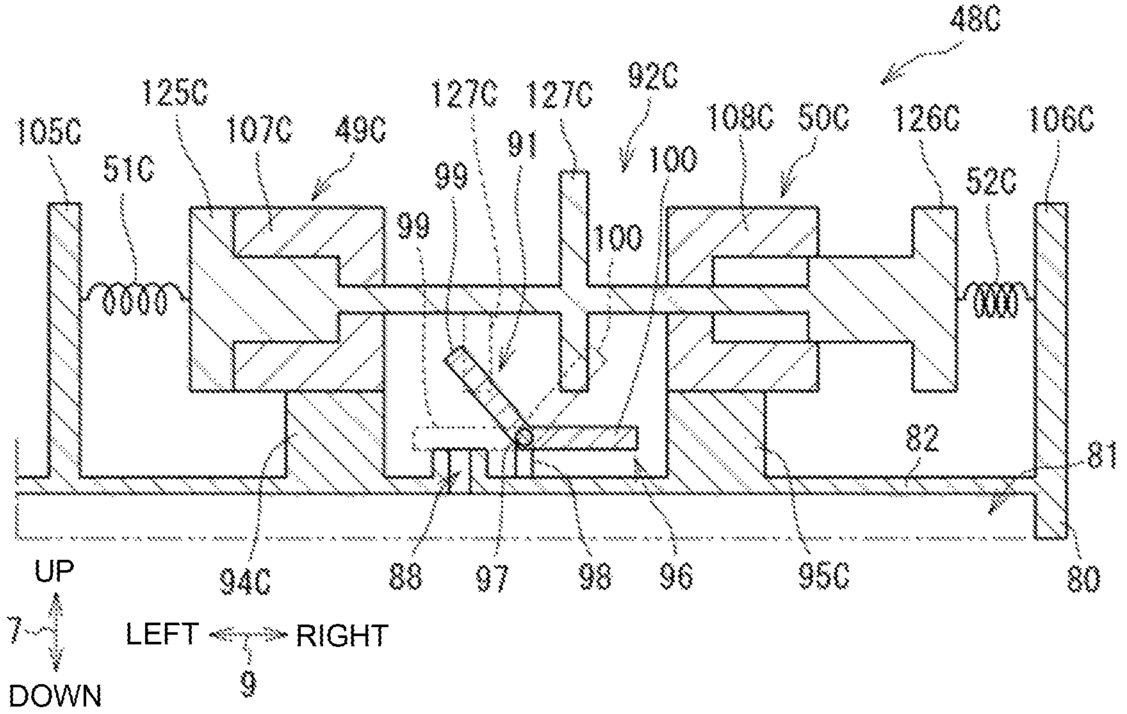
FIG. 13A is a cross-sectional view of an atmosphere communicating device of a multifunction peripheral according to a second embodiment, indicating a state of a valve unit in a state that the electric power is supplied to a first electric actuator.
Figure 13B:
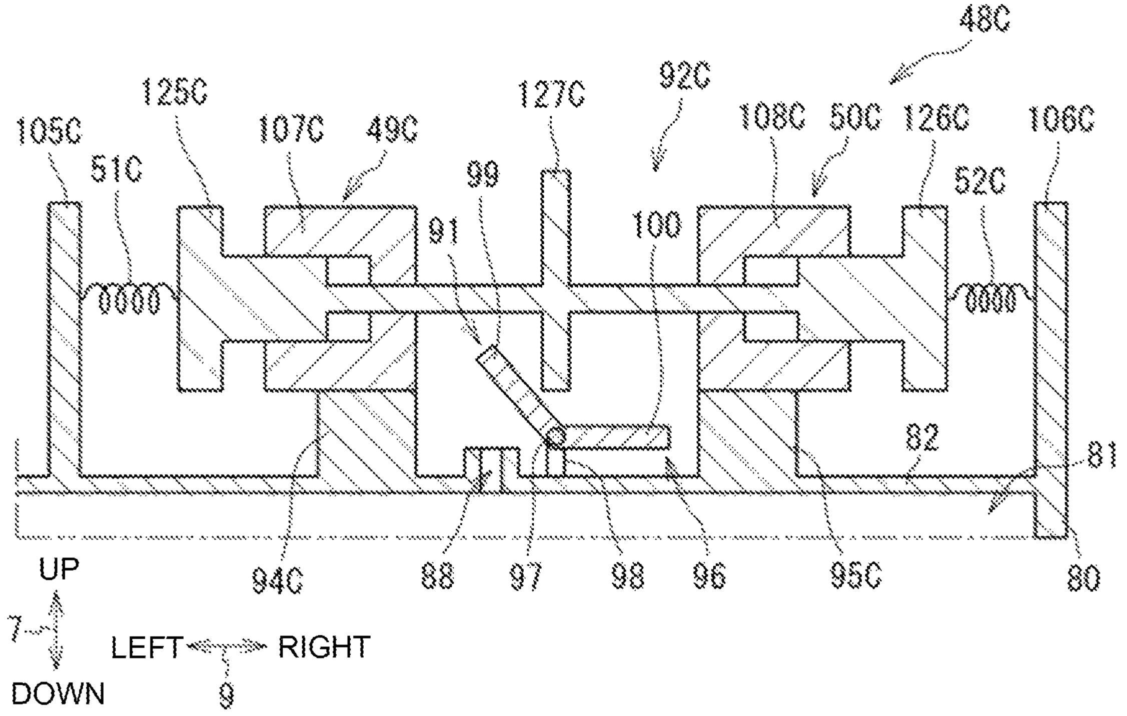
FIG. 13B is a cross-sectional view indicating a state of the valve unit in a state that the electric power is supplied to the first electric actuator and then the supply of the electric power is stopped.

FIG. 13A depicts a state of the valve unit 91, in the atmosphere communicating device 48C, that the electric power is supplied to a first electric actuator 49C but is not supplied to a second electric actuator 50C. Further, FIG. 13B depicts a state of the valve unit 91, in the atmosphere communicating device 48C, that after the electric power has been supplied the first electric actuator 49C, the supply of the electric power to both of the first electric actuator 49C and the second electric actuator 50C is stopped.

The atmosphere communicating device 48C in the second embodiment is provided with a valve unit 91 and a driving mechanism 92C.

Since the valve unit 91 has the same configuration as that of the first embodiment, the explanation of the respective configurations of the valve unit 91 will be omitted. In the second embodiment, the rotation supporting stand 98 is positioned on the right side with respect to the atmosphere opening port 88. In a case that the rotating piece 96 rotates about the rotating shaft 97, the first rotating piece 99 closes or opens (releases) the atmosphere opening port 88.

The driving mechanism 92C is provided with the first electric actuator 49C, the second electric actuator 50C, a first coil spring 51C and a second coil spring 52C. The driving mechanism 92C is operated by the electric power supplied from the controller 130, and drives the valve unit 91. The driving mechanism 92C is provided on the upper wall 82 of the tank 80. The first electric actuator 49C is supported, for example, by a first spring seat 105C located on a left part of the upper wall 82, and the second electric actuator 50C is supported, for example, by a second spring seat 106C located on a right part of the upper wall 82. The first electric actuator 49C is provided with a first coil part 107C and a first plunger 125C. The second electric actuator 50C is provided with a second coil part 108C and a second plunger 126C. The first electric actuator 49C and the second actuator 50C are arranged so that a forward end of the first electric actuator 49C and a forward end of the second actuator 50C face each other.

A forward end of the first plunger 125C and a forward end of the second plunger 126C are each connected to a contacting part 127C. A lower end of the contacting part 127C is located in the vicinity of an upper end of the rotating shaft 97. The contacting part 127C makes contact with the upper surface of the rotating piece 96. The contacting part 127C is movable in the left-right direction 9 with respect to the rotating piece 96.

The first plunger 125C and the second plunger 126C are movable along the left-right direction 9 with respect to the first coil part 107C and the second coil part 208C, respectively. In a case that an induction field is generated in the first coil part 107C by the turning on of the power, the first plunger 125C moves rightward with respect to the first coil part 107C. In a case that the induction field is generated in the second coil part 108C by the turning on of the power, the second plunger 126C moves leftward with respect to the second coil part 108C.

As depicted in FIGS. 13A and 13B, the first spring seat 105C projects upward on the upper wall 82, of the tank 80, on the left side with respect to the atmosphere opening port 88. The second spring seat 106C projects upward in the vicinity of a right end of the upper wall 82 of the tank 80. The second spring seat 106C is positioned on the right side with respect to the atmosphere opening port 88.

The first coil spring 51C is supported by the first spring seat 105C and the contacting part 127C, and the second coil spring 52C is supported by the second spring seat 106C and the contacting part 127C; the first coil spring 51C and the second coil spring 52C each extend along the left-right direction 9. The first coil spring 51C urges the contacting part 127C rightward. The second coil spring 52C urges the contacting part 127C leftward. The urging force of the first coil spring 51C and the urging force of the second coil spring 52C are same.

The first electric actuator 49C is supported by a first supporting stand 94C which is provided on the upper wall 82, at a location between the first spring seat 105C and the atmosphere opening port 88. The second electric actuator 50C is supported by a second supporting stand 95C which is provided on the upper wall 82, at a location between the second spring seat 106C and the atmosphere opening port 88.

In a state that the electric power is not supplied to the first coil part 107C and the second coil part 108C, the contacting part 127C is urged by each of the first coil spring 51C and the second coil spring 52C, and the contacting part 127C is located in the vicinity of the rotating shaft 97, as depicted in FIG. 13B.

In a state that the electric power is supplied to the first coil part 107C and is not supplied to the second coil part 108C, the contacting part 127C is in a state of being moved rightward against the urging force of the second coil spring 52C, as depicted in FIG. 13A. In this state, the contacting part 127C is located on the right side with respect to the rotating shaft 97, and makes contact with the second rotating piece 100. With this, the first rotating piece 99 is separated from the atmosphere opening port 88. Namely, the atmosphere opening port 88 is in the communication state.

Further, in a state that the electric power is not supplied to the first coil part 107C and is supplied to the second coil part 108C, the contacting part 127C is in a state of being moved leftward against the urging force of the first coil spring 51C, as depicted by broken lines in FIG. 13A. In this state, the contacting part 127C is located on the left side with respect to the rotating shaft 97, and makes contact with the first rotating piece 99. With this, the first rotating piece 99 closes the atmosphere opening port 88. Namely, the atmosphere opening port 88 is in the non-communication state.

In a case that the electric power is supplied to the first coil part 107C of the first electric actuator 49C and then the electric power supply to the first coil part 107C of the first electric actuator 49C is stopped, then as depicted in FIG. 13B, the contacting part 127C moves on the second rotating piece 100 leftward by the urging forces of the first coil spring 51C and the second coil spring 52C, and is positioned above the rotating shaft 97. In this situation, the posture of the valve unit 91 is maintained, without being changed, and the atmosphere opening port 88 is maintained at being in the communication state. In a case that the electric power is supplied to the second coil part 108C of the second electric actuator 50C, and then the electric power supply to the second coil part 108C of the second electric actuator 50C is stopped, then the contacting part 127C moves rightward by the urging force of the first coil spring 51C, and is positioned above the rotating shaft 97. In this situation, the posture of the valve unit 91 is maintained, without being changed, and the atmosphere opening port 88 is maintained at being in the non-communication state.

<First Modification of Second Embodiment>

The driving mechanism 92 of the second embodiment moves the contacting part 127C in the left-right direction 9 so as to change the posture of the valve unit 91 to the communication state or the non-communication state. As depicted in FIGS. 14A to 14D, however, the driving mechanism 92 may, for example, rotate an eccentric cam to thereby change the posture of a valve unit 91D to the communication state or the non-communication state.

As depicted in FIGS. 14A to 14D, an atmosphere communicating device 48D is provided with a valve unit 91D and a rotating device 92D. The valve unit 91D is provided with a rotating piece 96D and a rotating shaft 97D.

The rotating piece 96D has a shape which is bent in the vicinity of the center thereof, and which is a shape of the letter "V" as seen from the front-rear direction 8. The rotating piece 96D is provided on the right side with respect to the atmosphere opening port 88. A part which extends leftward from the bent location in the rotating piece 96D is referred to as a first rotating piece 99D, and another part which extends rightward from the bent location in the rotating piece 96D is referred to as a second rotating piece 100D. The rotating shaft 97 projects, along the front-rear direction 8, from the boundary between the first rotating piece 99D and the second rotating piece 100D.

The first rotating piece 99D has a first upper side surface 116 in an upper surface at a location on a side of a forward end of the first rotating piece 99D. The first upper side surface 116 becomes horizontal in a case that the first rotating piece 99D is in a horizontal state. Further, the first rotating piece 99D has a first inclined surface 117 in the upper surface at a location on a side of a base end of the first rotating piece 99D. The first inclined surface 117 is in an inclined state in the case that the first rotating piece 99D is in the horizontal state.

The second rotating piece 100D has a second upper side surface 118 in an upper surface at a location on a side of a forward end of the second rotating piece 100D. The second upper side surface 118 becomes horizontal in a case that the second rotating piece 100D is in a horizontal state. Further, the second rotating piece 100D has a second inclined surface 119 in the upper surface at a location on a side of a base end of the second rotating piece 100D. The second inclined surface 119 is in an inclined state in the case that the second rotating piece 100D is in the horizontal state.

The rotating device 92D is provided with a supporting wall 156, a cam shaft 157, regulating shafts 158 and an eccentric cam 159. The rotating device 92D is driven by the electric power supplied from the controller 130, and drives the valve unit 91D.

The supporting wall 156 is provided on the upper wall 82. The supporting wall 156 is formed, for example, to have a flat plate-like shape, and is arranged in the vicinity of the atmosphere opening port 88. The cam shaft 57 extending frontward is provided on the supporting wall 156. Further, the regulating shafts 158 configured to regulate the rotation of the eccentric cam 159 are provided on the supporting wall 158 on, respectively, both on the left and right sides of the cam shaft 57.

The eccentric cam 159 is supported rotatably by the cam shaft 157. A contacting part 127D extending toward the rotating piece 96D of the valve unit 91D is formed in the eccentric cam 159. Regulating parts 161 configured to make contact with the regulating shafts 158 are formed in the eccentric cam 159. The regulating parts 161 regulate a range in which the eccentric cam 159 rotates.

In the following, an operation of the eccentric cam 159 by the turning on and off of the electric power source with respect to the rotating device 92D will be explained.

Figure 14A:
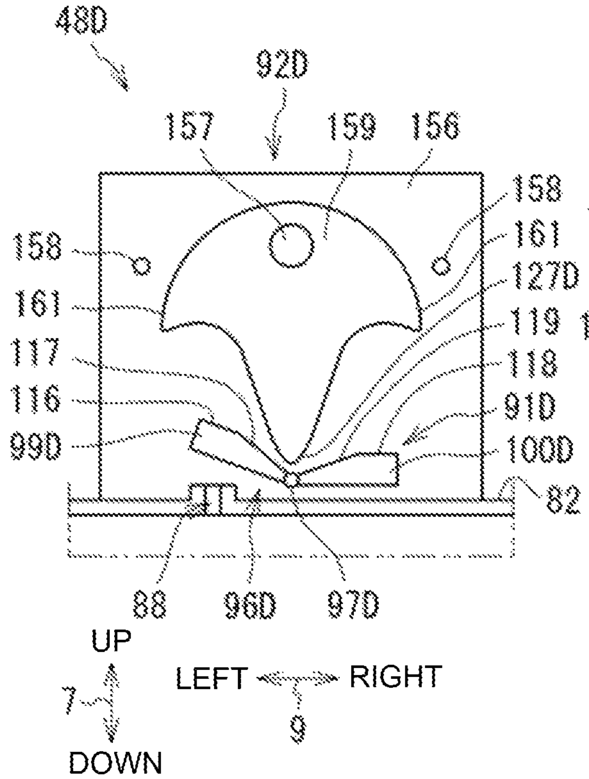
FIGS. 14A to 14D are each a cross-sectional view depicting an atmosphere communicating device of a multifunction peripheral according to a first modification of the second embodiment, indicating a state that a valve unit changes a posture thereof to the communication state or to the non-communication state.
Figure 14B:
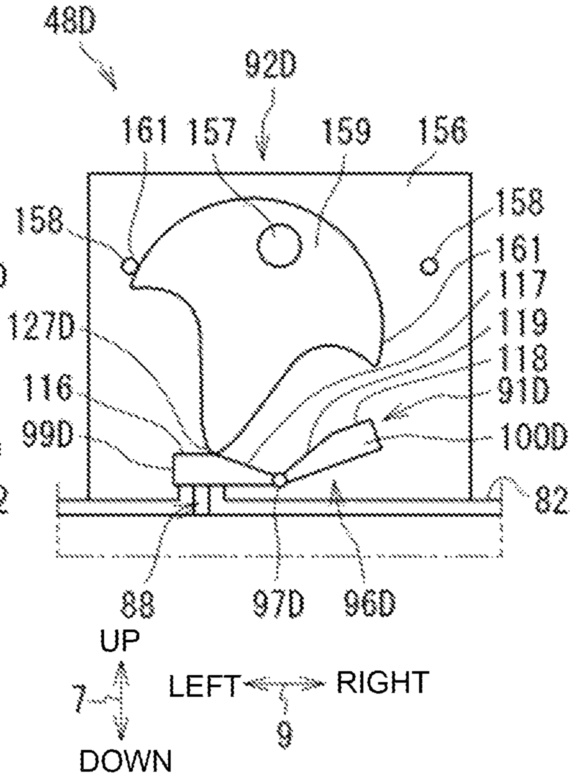

As depicted in FIGS. 14A and 14B, in a case that the electric power is supplied to the rotating device 92D, the eccentric cam 159 rotates so as to make the contacting part 127D to rotate leftward from a position above the rotating shaft 97. The rotated contacting part 127D transmits the driving force to the first rotating piece 99D to thereby rotate the rotating piece 96D. In this situation, a regulating part 161, of the regulating parts 161, which is arranged on the left side is brought into contact with a regulating shaft 158, of the regulating shafts 158, which is arranged on the left side to thereby regulate the movement of the eccentric cam 159, as depicted in FIG. 14B. As a result, the contacting part 127D stops in the vicinity of the boundary between the first upper side surface 116 and the first inclined surface 117. Then, the posture of the valve unit 91D is changed from the communication state to the non-communication state.

Figure 14C:
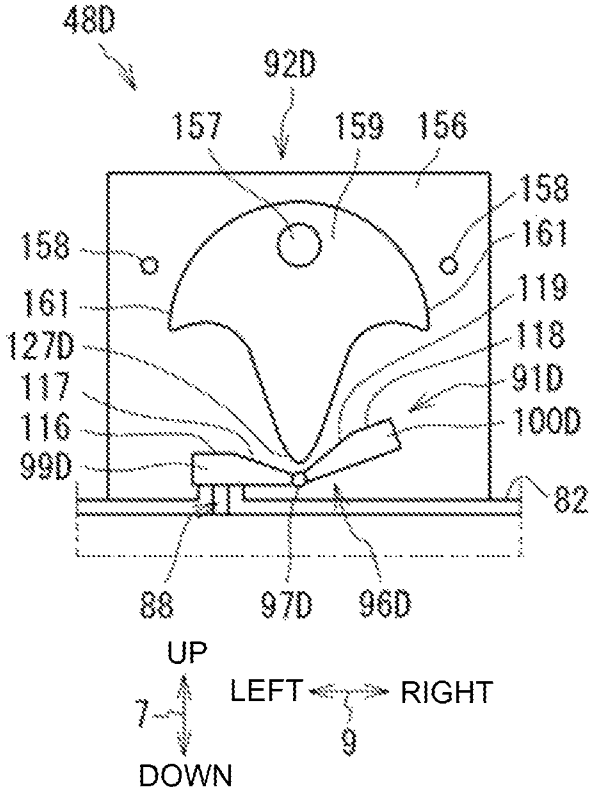

In a case that the supply of the electric power to the rotating device 92D is stopped, the eccentric cam 159 rotates rightward and the contacting part 127D stops at the location above the rotating shaft 97, as depicted in FIG. 14C. In this situation, the posture of the valve unit 91D is maintained, without being changed, and the atmosphere opening port 88 is maintained at being in the non-communication state.

Figure 14D:
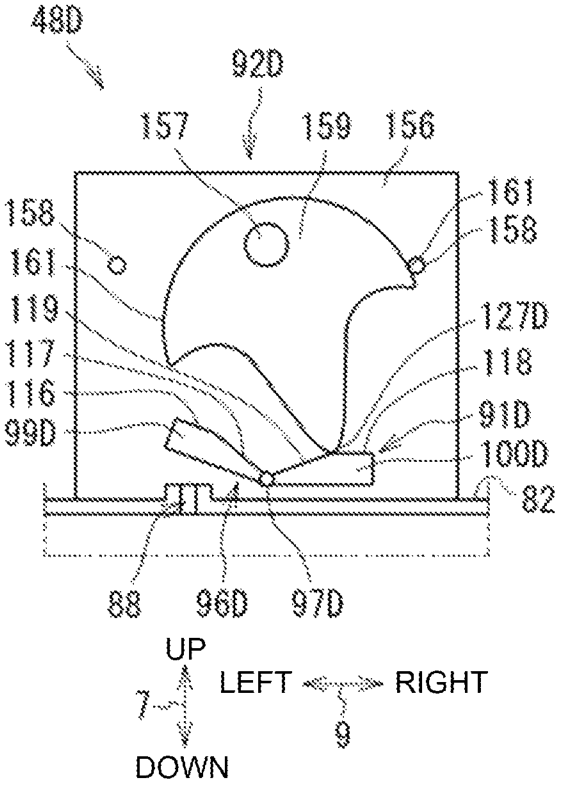

In a case that an electric current of which orientation is reverse to that of the above-described supply of the electric power is supplied to the rotating device 92D, then, the eccentric cam 159 rotates rightward as depicted in FIGS. 14C and 14D, and the contacting part 127D rotates rightward from the position above the rotating shaft 97. The rotated contacting part 127D transmits the driving force to the second rotating piece 100D to thereby rotate the rotating piece 96D. In this situation, a regulating part 161, of the regulating parts 161, which is arranged on the right side is brought into contact with a regulating shaft 158, of the regulating shafts 158, which is arranged on the right side to thereby regulate the movement of the eccentric cam 159, as depicted in FIG. 14D. As a result, the contacting part 127D stops in the vicinity of the boundary between the second upper side surface 118 and the second inclined surface 119. Then, the posture of the valve unit 91D is changed from the non-communication state to the communication state.

<Second Modification of Second Embodiment>

Figures 15A, 15B, 15C:
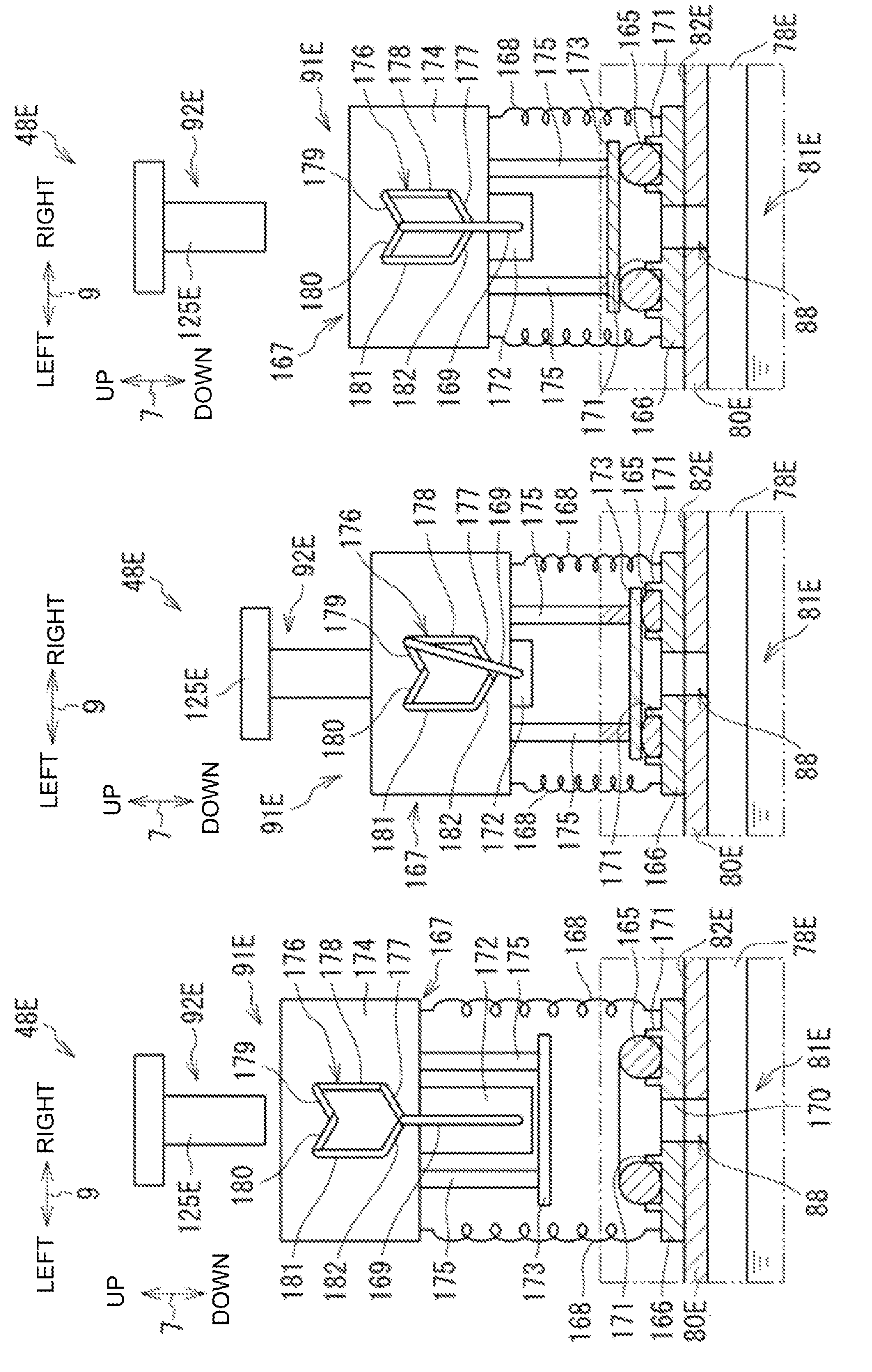
FIGS. 15A to 15C are each a partial cross-sectional view depicting an atmosphere communicating device of a multifunction peripheral according to a second modification of the second embodiment, indicating a state that a valve unit changes a posture thereof to the communication state or to the non-communication state.

In the second embodiment, the explanation has been given regarding, as an example, the atmosphere communicating device 48C constructed of the valve unit 91, and the driving mechanism 92C provided with the first electric actuator 49C and the second electric actuator 50C, as depicted in FIGS. 13A and 13B. It is allowable, however, that another device is used as the atmosphere communicating device 48. For example, it is allowable to use a device having a configuration as depicted in FIGS. 15A to 15C.

In the second modification, an atmosphere communicating device 48E is provided on an upper wall 82E of a tank 80E configured to store an ink. The atmosphere communicating device 48E is provided on an atmosphere communicating port 88 configured to communicate, in the upper wall 82E, an ink chamber 81E of the tank 80E to the outside.

The atmosphere communicating device 48E is provided with a driving mechanism 92E and a valve unit 91E.

The driving mechanism 92E is configured to drive the valve unit 91E in the up-down direction 7. The driving mechanism 92E is provided with a plunger 125E and an electric actuator (not depicted in the drawings). In a case that the electric power is supplied to the driving mechanism 92E, the driving mechanism 92E is operated in the up-down direction 7 and drives the valve unit 91E. The driving mechanism 92E is provided on the upper wall 82E of the tank 80E.

The valve unit 91E is provided with a packing 165, a base part 166, a slide part 167, a pair of elastic parts 168, 168 and a regulating pin 169.

The packing 165 is a member configured to prevent the air from leaking from a gap in a case that the valve unit 91E is in the non-communication state. A lower part of the packing 165 makes contact with the base part 166. The packing 165 is elastically deformed by being pressed by a lid part 173 (to be described later on).

The base part 166 has a through hole 170 at a central part thereof, and is formed to have a substantially disc-like shape. A lower surface of the base part 166 is formed to be flat. The through hole 170 is continued to the atmosphere opening port 88 in a state that the base part 166 is provided. Namely, in the state that the base part 166 is provided on the tank 80E, the atmosphere opening port 88 communicates a gas layer 78E of the ink chamber 81E to the outside. Further, a projection 171 configured to hold the packing 165 on the base part 166 is formed in the upper surface of the base part 166. The projection 171 is formed so as to project upward at the inner circumference side and the outer circumference side of the packing 165.

The slide part 167 is connected to the base part 166 via a pair of elastic parts 168, 168. The slide part 167 moves in the up-down direction 7 by the driving force applied by the driving mechanism 92E. Further, the slide part 167 is configured to be slidably movable with respect to, for example, a fixed member 172 which is fixed to the tank 80E. The slide part 167 is provided with a lid part 173, a body part 174 and a pillar part (column part) 175.

The lid part 173 is configured to close or release (open) the atmosphere opening port 88 so as to make the atmosphere opening port 88 to be in the communication state or the non-communication state. The lid part 173 approaches closely to the base part 166 in a state that the packing 165 is interposed therebetween. The lid part 173 is formed, for example, to have a disc-like shape.

An upper end of the pillar part 175 is fixed to the body part 174, and the pillar part 175 extends downward from the body part 174. A lower end of the pillar part 175 supports the lid part 173.

The body part 174 is supported by the pair of elastic members 168, 168. The body part 174 is movable in the up-down direction 7 relative to the fixed member 172. As depicted in FIGS. 15A to 15C, the body part 174 is connected to the fixed member 172 via a regulating pin 169 configured to regulate a moving range in the up-down direction 7. A groove part 176 is formed in a front surface of the body part 174.

One end side of the regulating pin 169 is slidably connected to the slide part 167. The other end side of the regulating pin 169 is rotatably supported by the fixed member 172.

As depicted in FIGS. 15A to 15C, the groove part 176 has a first groove 177 extending obliquely rightward and upward from a lower part of the body part 174; a second groove 178 extending upward from a right upper end part of the first groove 177; a third groove 179 extending obliquely leftward and downward from an upper end part of the second groove 178; a fourth groove 180 extending obliquely leftward and upward from a left lower end of the third groove 179; a fifth groove 181 extending downward from a left upper end of the fourth groove 180; and a sixth groove 182 extending obliquely rightward and downward from a lower end of the fifth groove 181.

A starting point of the first groove 177 is coincident with an end point of the sixth groove 182. The first groove 177 and the third groove 179 are parallel to each other, and have a same groove length. The second groove 178 and the fifth groove 181 are parallel to each other, and have a same groove length. The fourth groove 180 and the sixth groove 182 are parallel to each other, and have a same groove length. The second groove 178 is formed to be deeper than the first groove 177, and is configured so that after the regulating pin 169 moves from the first groove 177 to the second groove 178, the regulating pin does not return from the second groove 178 to the first groove 177. Similarly, the third groove 179 is formed to be deeper than the second groove 178; the fourth groove 180 is formed to be deeper than third groove 179; and the fifth groove 181 is formed to be deeper than the fourth groove 180. Further, the first groove 177 is formed to be deeper than the sixth groove 182. Namely, the regulating pin 169 moves in an order of the first groove 177, the second groove 178, the third groove 179, the fourth groove 180, the fifth groove 181 and the six groove 182.

In the following, an operation of the slide part 167 with respect to the regulating pin 169 will be explained.

As depicted in FIG. 15A, in a case that the slide part 167 is positioned uppermost, the regulating pin 169 is positioned at the start point of the first groove 177 which is the lowermost location in the groove part 176. In this situation, the lid part 173 is in a state of being separated from the base part 166, and the atmosphere opening port 88 is in the communication state. Next, in a case that the electric power is supplied to the electric actuator, the slide part 167 is pressed downward by the plunger 125E, which in turn moves the regulating pin 169 to the endpoint of the first groove 177. In a case that the slide part 167 is pressed further downward by the plunger 125E, the regulating pin 169 moves from the start point of the second groove 178 to the end point of the second groove 178, as depicted in FIG. 15B. In this situation, the lid part 173 approaches closely to the base part 166 in a state that the lid part 173 elastically deforms the packing 165, thereby making the atmosphere opening port 88 to be in the non-communication state.

Next, in a case that the supply of the electric power to the electric actuator is stopped, the plunger 125E returns upward, and the slide part 167 is urged upward by the pair of elastic parts 168, 168, as depicted in FIG. 15C. With this, the regulating pin 169 moves from the start point of the third groove 179 to the end point of the third groove 179, and stops. In this situation, although the lid part 173 is separated from the base part 166 and moves upward, but is in a state of making contact with the packing 165 which is restoring from having been elastically deformed. Accordingly, the atmosphere opening port 88 is maintained at being in the non-communication state.

Afterwards, in a case that the electric power is supplied again to the electric actuator, the regulating pin 169 moves from the start point of the fourth groove 180 to the end point of the fourth groove 180. Next, in a case that the supply of the electric power to the electric actuator is stopped, the regulating pin 169 moves from the start point of the fifth groove 181 to the end point of the sixth groove 182, via the end point of the fifth groove 181, and stops. In this situation, the lid part 173 is in the state depicted in FIG. 15A. Namely, the lid part 173 is in the state of being separated from the base part 166, and the atmosphere opening port 88 is in the communication state.

Third Embodiment

In a third embodiment, a valve unit 91F is configured to change the state thereof, in association with movement of the carriage 40, to be in the non-communication state or the communication state.

Figure 16A:
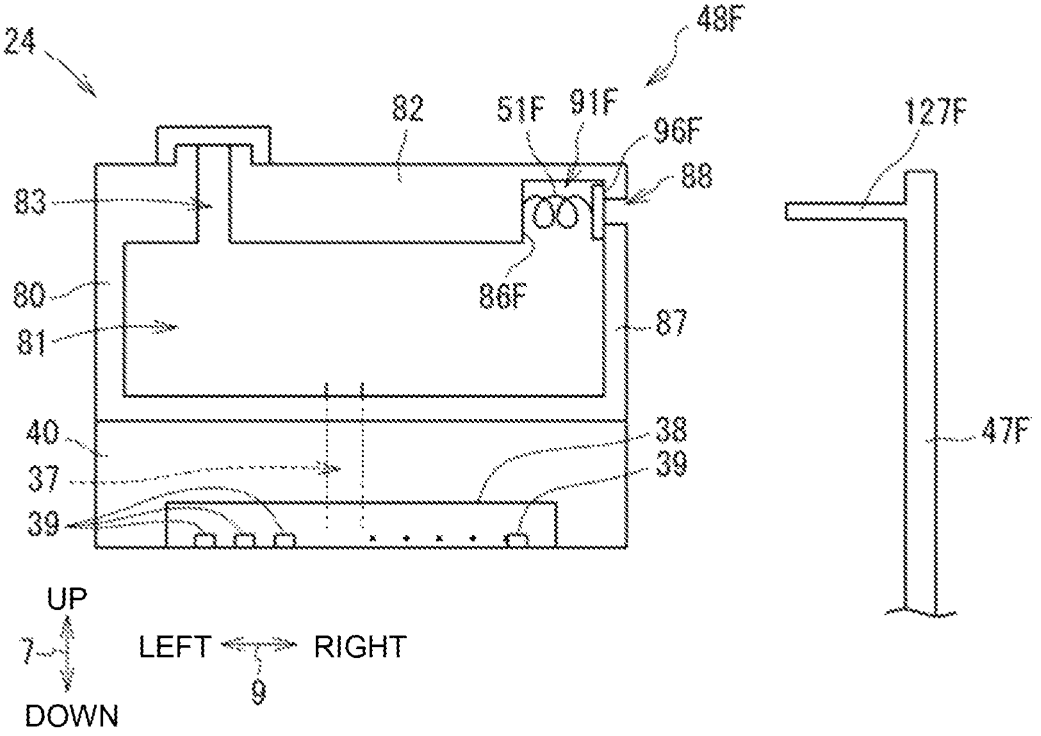
FIG. 16A is a cross-sectional view depicting an atmosphere communicating device of a multifunction peripheral according to a third embodiment, indicating the non-communication state of the valve unit in which a valve unit is separated with respect to the atmosphere opening port.
Figure 16B:
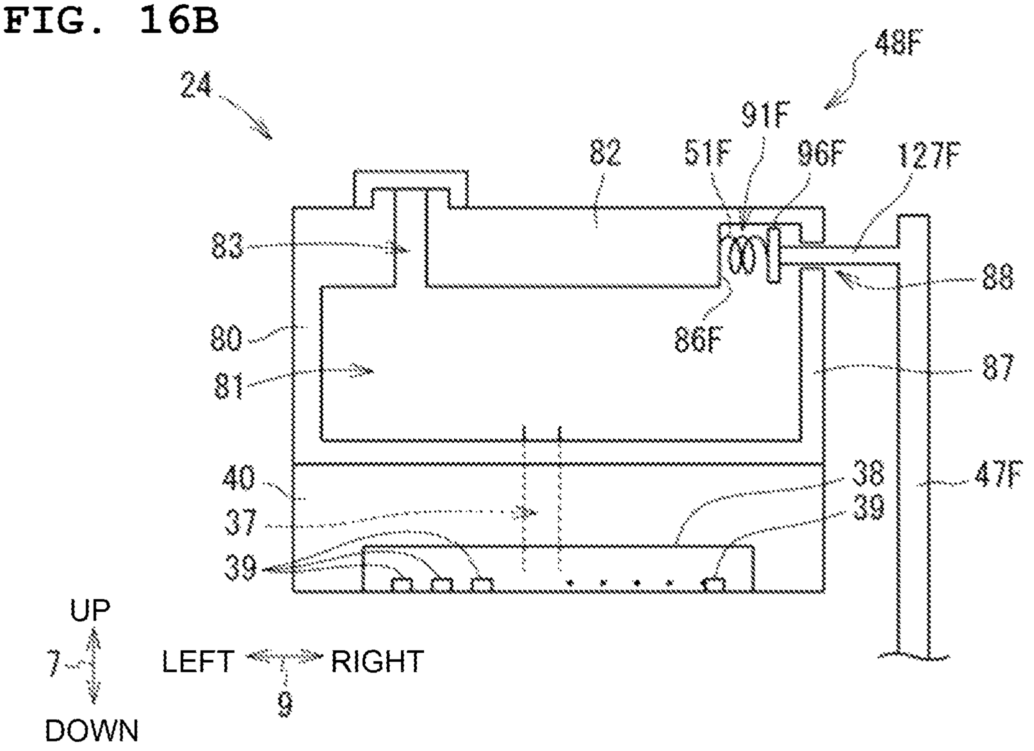
FIG. 16B is a cross-sectional view indicating the communication state of the valve unit in which the valve is brought into contact with the atmosphere opening port and the valve unit is in the communication state.

For example, as depicted in FIGS. 16A and 16B, it is allowable that the valve unit 91F is provided with a moving mechanism 48F, as a mechanism for making the atmosphere opening port 88 to be in the non-communication state or the communication state, rather than the atmosphere communicating device 48. The moving mechanism 48F is provided with a carriage 40, a valve unit 91F and a contacting part 127F. Note that in the third embodiment, the atmosphere opening port 88 is arranged at a location above a side wall 87 of the tank 80, and the atmosphere opening port 88 communicates the ink chamber 81 of the tank 80 with the outside.

The carriage 40 is driven by the carriage driving motor 103 (see FIG. 7) which serves as a driving source. The carriage 40 moves while having the head 38 mounted thereon. The carriage 40 is operated by the electric power supplied by the controller 130 (see FIG. 7).

The valve unit 91F is provided with a valve 96F and a coil spring member 51F.

The valve unit 96F is a member configured to make contact with or separate from the atmosphere opening port 88 to thereby make the atmosphere opening port 88 to be in the non-communication state or the communication state.

The coil spring member 51F is a member configured to urge the valve 96F rightward so as to bring the valve 96F into contact with the atmosphere opening port 88. The coil spring member 51F is a member in which one end side of the coil spring member 51F is connected to the valve 96F, and the other end side of the coil spring member 51F is connected to a side surface 86F which is formed inside the tank 80.

The contacting part 127F is a member projecting from a frame 47F which expands in the up-down direction 7. The contacting part 127F is located at a position same as that of the atmosphere opening port 88 in the up-down direction 7 and the front-rear direction 8. Further, the diameter of the contacting part 127F is smaller than the diameter of the atmosphere opening port 88.

In the following, an operation of the moving mechanism 48F will be explained.

In a process in which the carriage 40 moves to the maintenance position, the contacting part 127F penetrates the atmosphere opening port 88 from the right side, and presses the valve 96F leftward. With this, the valve 96F moves leftward against the urging force of the coil spring 51F, thereby making the valve unit 91F to be in the communication state from the non-communication state.

On the other hand, in a case that the carriage 40 moves leftward from the maintenance position, the valve 96F is separated from the contacting part 127F, and thus the valve unit 91F is urged rightward by the coil spring member 51F, thereby making the valve unit 91F to be in the non-communication state from the communication state.

Namely, in a case that the controller 130 changes the power source of the multifunction peripheral 10 from being in the on state to being in the off state, the controller 130 drives the carriage driving motor 103 so as to make the valve unit 91F to be in the communication state from the non-communication state; and in a case that the controller 130 changes the power source of the multifunction peripheral 10 from being in the off state to being in the on state, the controller 130 drives the carriage driving motor 103 so as to make the valve unit 91F to be in the non-communication state from the communication state.

What is claimed is:

1. A liquid discharging apparatus comprising:

a head having a nozzle configured to discharge liquid therefrom;

a storing part, the liquid being stored in the storing part while forming a liquid surface, the storing part including a liquid layer including the liquid and a gas layer above the liquid layer, wherein at least a part of the storing part is positioned over the head;

a channel extending from a lower surface of the storing part directly to the head and configured to supply the liquid directly from the liquid layer to the head;

a port configured to communicate the gas layer of the storing part with outside of the storing part; and a valve unit configured to be switched between a communication state in which the valve unit communicates the gas layer of the storing part with the outside of the storing part and a non-communication state in which the valve unit does not communicate the gas layer of the storing part with the outside of the storing part, wherein when electric power is supplied to the liquid discharging apparatus, the liquid discharging apparatus is to be in a first state, in which a driving source in the liquid discharging apparatus is configured to be driven in response to an input by a user, or in a second state, in which electric power supply is stopped to the driving source to save power, and the valve unit is configured to be switched from the non-communication state to the communication state in response to the liquid discharging apparatus receiving an instruction to transition to the second state.

2. The liquid discharging apparatus according to claim 1, further comprising:

a driving mechanism configured to drive the valve unit; and a controller, wherein in the case that the power source is changed from a turned-on state to a turned-off state, the controller is configured to drive the driving mechanism to switch the valve unit from the non-communication state to the communication state.

3. The liquid discharging apparatus according to claim 2, wherein in a state that the power source is in the turned-off state, the controller is configured to drive the driving mechanism based on a predetermined first condition to switch the valve unit from the communication state to the non-communication state.

4. The liquid discharging apparatus according to claim 3, wherein in the state that the power source is in the turned-off state, the controller is configured to drive the driving mechanism based on a predetermined second condition to switch the valve unit from the non-communication state to the communication state.

5. The liquid discharging apparatus according to claim 2, wherein the valve unit is configured to be switched between the non-communication state and the communication state by rotation of the valve unit, and the driving mechanism has a first electric actuator configured to switch the valve unit from the non-communication state to the communication state, and a second electric actuator configured to switch the valve unit from the communication state to the non-communication state.

6. The liquid discharging apparatus according to claim 2, wherein the valve unit is configured to be switched between the non-communication state and the communication state by rotation of the valve unit, and the driving mechanism has an eccentric cam configured to switch the valve unit between the non-communication state and the communication state.

7. The liquid discharging apparatus according to claim 1, further comprising:

a carriage configured to move while having the head mounted thereon;

a motor configured to drive the carriage; and a controller, wherein the valve unit is configured to change a state thereof in association with movement of the carriage, and in the case that the power source is changed from a turned-on state to a turned-off state, the controller is configured to drive the driving mechanism to switch the valve unit from the non-communication state to the communication state.

8. The liquid discharging apparatus according to claim 1, further comprising a driving mechanism configured to drive the valve unit, wherein the driving mechanism includes:

an urging member configured to hold the valve unit in the communication state, and an electric actuator configured to switch the valve unit from the communication state to the non-communication state against the urging member, in a case that an electric power is supplied to the electric actuator.

9. The liquid discharging apparatus according to claim 1, further comprising a carriage having the head mounted thereon, wherein the storing part is mounted on the carriage in a state that at least a part of the storing part is located above the head.

10. The liquid discharging apparatus according to claim 9, wherein the carriage is configured to move in a scanning direction; and the head is configured to discharge the liquid in a case that the carriage is moving in the scanning direction.

11. The liquid discharging apparatus according to claim 1, wherein the storing part has:

a first storing chamber; and a second storing chamber which is connected to the first storing chamber and to the head so that the liquid is allowed to flow in the second storing chamber.

12. The liquid discharging apparatus according to claim 1, further comprising an atmosphere communicating channel including the port, wherein the atmosphere communicating channel has one of a labyrinth structure and a semipermeable membrane, or both of the labyrinth structure and the semipermeable membrane.

13. The liquid discharging apparatus according to claim 1, further comprising:

a cap configured to move to a covering position at which the cap covers the nozzle and to a separate position at which the cap is separated from the nozzle;

a cap communicating channel configured to communicate an internal space of the cap with outside of the cap via a cap opening port; and a cap valve unit configured to be switched between a cap communication state in which the cap valve unit communicates the internal space of the cap and the outside of the cap and a cap non-communication state in which the cap valve unit does not communicate the internal space of the cap with the outside of the cap, wherein the cap valve unit is configured to be switched from the cap non-communication state to the cap communication state in the case that the power source is changed from a turned-on state to a turned-off state.

14. A liquid discharging apparatus comprising:

a head having a nozzle configured to discharge liquid therefrom;

a storing part, the liquid being stored in the storing part while forming a liquid surface, the storing part including a liquid layer including the liquid and a gas layer above the liquid layer, wherein at least a part of the storing part is positioned over the head;

a channel extending from a lower surface of the storing part directly to the head and configured to supply the liquid directly from the liquid layer to the head;

a cap having an open upper part positioned below the nozzle, wherein the head is movable relative to the cap, and wherein the cap is configured to selectively receive the liquid from the nozzle when the head is in a maintenance position;

a port configured to communicate the gas layer of the storing part with outside of the storing part; and a valve unit configured to be switched between a communication state in which the valve unit communicates the gas layer of the storing part with the outside of the storing part and a non-communication state in which the valve unit does not communicate the gas layer of the storing part with the outside of the storing part, wherein the valve unit is configured to be switched from the non-communication state to the communication state in a case that a power source is changed from a turned-on state to a turned-off state.

15. The liquid discharging apparatus according to claim 1, further comprising a carriage having the head and the storing part mounted thereon.

* * * * *